US012579693B2

(12) United States Patent
Kim et al.

(10) Patent No.: US 12,579,693 B2
(45) Date of Patent: Mar. 17, 2026

(54) ELECTRONIC SHELF LABEL MANAGING SERVER, DISPLAY DEVICE AND CONTROLLING METHOD THEREOF

(71) Applicant: AJOU UNIVERSITY INDUSTRY-ACADEMIC COOPERATION FOUNDATION, Suwon-si (KR)

(72) Inventors: Ki Hyung Kim, Seongnam-si (KR); Young Jun Kim, Suwon-si (KR)

( * ) Notice: Subject to any disclaimer, the term of this patent is extended or adjusted under 35 U.S.C. 154(b) by 591 days.

(21) Appl. No.: 17/537,799

(22) Filed: Nov. 30, 2021

(65) Prior Publication Data

US 2022/0172403 A1 Jun. 2, 2022

(30) Foreign Application Priority Data

Dec. 1, 2020 (KR) ........................ 10-2020-0165925

(51) Int. Cl.
| | |
|---|---|
| *G06T 9/00* | (2006.01) |
| *G06T 3/40* | (2006.01) |
| *G09F 3/20* | (2006.01) |

(52) U.S. Cl.
CPC ................... *G06T 9/00* (2013.01); *G06T 3/40* (2013.01); *G09F 3/208* (2013.01)

(58) Field of Classification Search
CPC ..... G06T 9/00; G06T 3/40; G06T 9/20; G09F 3/208
See application file for complete search history.

(56) References Cited

U.S. PATENT DOCUMENTS

2016/0086353 A1* 3/2016 Lukac ....................... G06T 9/00
345/419

FOREIGN PATENT DOCUMENTS

KR 2018021558 A * 3/2018 ......... G06Q 30/0601

OTHER PUBLICATIONS

Kuivinen, Robin. Evaluation of Image Compression Algorithms for Electronic Shelf Labels. 2009. (Year: 2009).*
Mongus, Domen, et al. "Chain code compression using string transformation techniques." Digital Signal Processing 53 (2016): 1-10. (Year: 2016).*

(Continued)

*Primary Examiner* — Siamak Harandi
*Assistant Examiner* — Denise G Alfonso
(74) *Attorney, Agent, or Firm* — ANTONIO HA & U.S. PATENT, LLC

(57) ABSTRACT

An Electronic Shelf Label (ESL) management server and a method for controlling the ESL management server are disclosed. An ESL management server for compressing an image to be displayed on an external display device of the ESL system comprises a communication unit obtaining an image including product information; and a processor applying a first pre-processing process to the image, chain coding the image to which the first pre-processing process has been applied, encoding a chain code and a chain code table obtained as a result of the chain coding into a bitstream, generating a compressed image file using the bitstream, and transmitting the compressed image file to an external display device through the communication unit, where the first pre-processing process converts data with a high local correlation within the image into a small integer but converts data with a small local correlation within the image into a large integer.

12 Claims, 15 Drawing Sheets

(56) References Cited

OTHER PUBLICATIONS

Žalik, Borut, and Niko Lukač. "Chain code lossless compression using move-to-front transform and adaptive run-length encoding." Signal Processing: Image Communication 29.1 (2014): 96-106. (Year: 2014).*

Scheffler, Marco, and Thomas Greiner. "Enhanced contour chain-coding and topological hierarchy analysis in a single-pass raster scan." 2012 35th International Conference on Telecommunications and Signal Processing (TSP). IEEE, 2012. (Year: 2012).*

Jeromel, Aljaž, and Borut Žalik. "An efficient lossy cartoon image compression method." Multimedia Tools and Applications 79.1 (2020): 433-451. (Year: 2020).*

* cited by examiner

| Data | | 401 | | Stack | | |
|---|---|---|---|---|---|---|
| A B B A B B C B B B B | | | | 0 | 1 | 2 |
| 0 1 B A B B C B B B B | | | | A | B | C |
| 0 1 0 1 B B C B B B B | | | | B | A | C |
| 0 1 0 1 1 0 2 B B B B | | | | A | B | C |
| 0 1 0 1 1 0 2 B B B B | | | | B | A | C |
| 0 1 0 1 1 0 2 1 B B B | | | | C | B | A |
| 0 1 0 1 1 0 2 1 0 0 0 | | | | B | C | A |

601

FIG. 9
| Perform color separation and binary MTFT | —S901 |
| Perform chain code encoding | —S903 |
| Transform chain code tables | —S905 |
| Perform bitstream encoding and formatting | —S907 |
FIG. 10
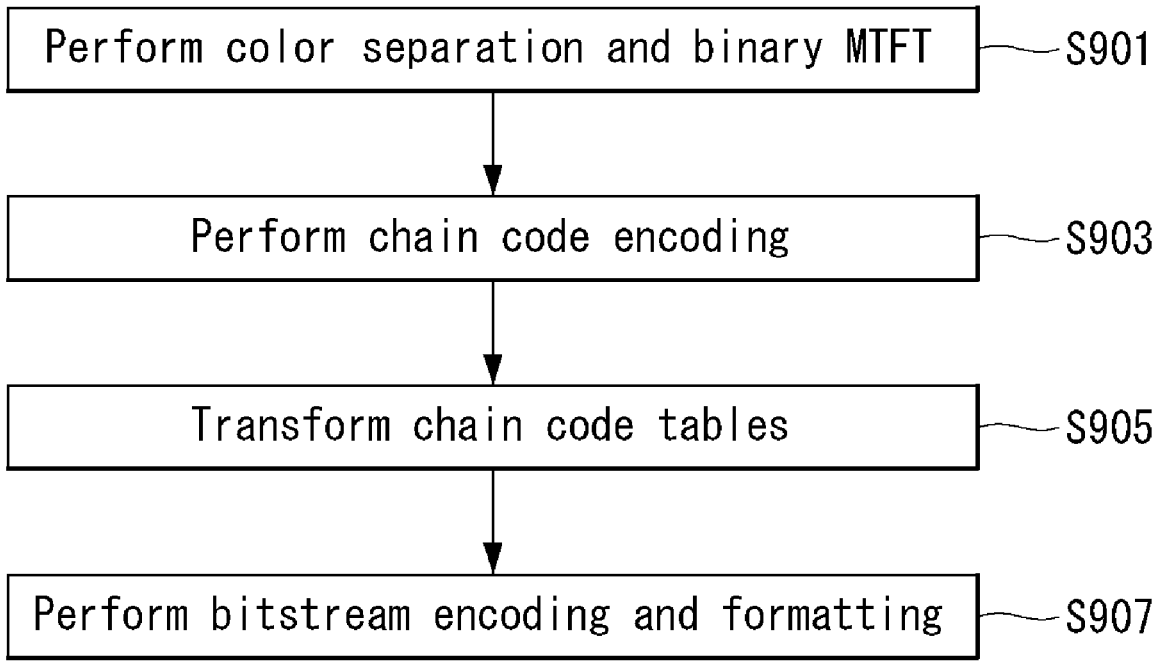
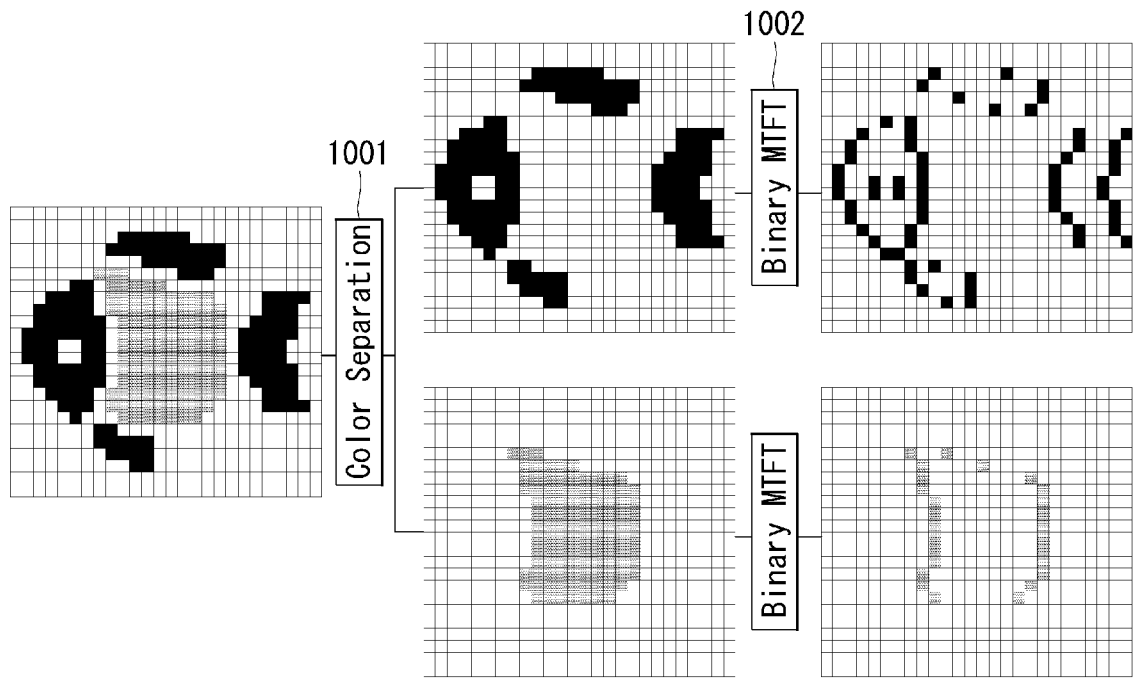

(A) $B_{bk}$　　　　　　　　(B) $B_{rd}$ 1201　　　　　1202　　　　　1203

| Perform header parsing | ⎯S1301 |

↓

| Decode transformed chain code tables | ⎯S1303 |

↓

| Decode concatenated chain codes | ⎯S1305 |

↓

| Perform reverse binary MTFT | ⎯S1307 |

(A) $O_{bk}$                           (B) $O_{rd}$

ELECTRONIC SHELF LABEL MANAGING SERVER, DISPLAY DEVICE AND CONTROLLING METHOD THEREOF

CROSS-REFERENCE TO RELATED APPLICATION

This application claims priority to Korean Patent Application No. 10-2020-0165925 filed in the Korean Intellectual Property Office on Dec. 1, 2020, the disclosure of which is incorporated by reference herein in its entirety.

BACKGROUND OF THE DISCLOSURE

Field of the Disclosure

The present disclosure relates to an Electronic Shelf Label (ESL) managing server, a display device, and a controlling method of the ESL managing server and, more particularly, to an ESL managing server, a display device, and a controlling method of the ESL managing server for compressing an image to be displayed on a tag of the ESL system.

Related Art

In general, most stores replace paper labels on shelves manually whenever their products' prices are changed. The manual replacement often caused a problem of reduced efficiency in terms of management or operation, such as customer complaints due to display errors and missing labels. Electronic shelf label (ESL) systems are being developed and commercialized to solve such a problem.

The Electronic Shelf Label (ESL) system refers to a system that displays product information on a plurality of tags through the system and provides and maintains the latest data synchronized with the system by updating the corresponding information in real-time according to the needs. Since the ESL system may improve the efficiency of store management by applying the inventory status of each product, a price change, a discount period, and the like simultaneously for all the stores, the ESL system is continuously being developed as an innovative technology in the retail market. Furthermore, the ESL system may provide customized services to buyers through interaction with the buyers using intelligent technology and communication technology beyond simply providing information and may enable efficient management such as price synchronization through online and offline interoperation. Therefore, the ESL system is getting attention as an IoT solution supposed to lead innovation in the retail industry.

Specifically, an ESL system comprises a management server, gateways, and tags, among which the management server receives a user's command through a console and transmits information to be displayed (for example, data such as a product price, an image, discount information, and a barcode) to the tag. In the ESL system, the management server transmits product information to the tag in the form of an image, where a technique for compressing the image of the product information is used to reduce the number of packets required for communication between the server and the tag.

Increasing the success rate of wireless communication in the ESL system is essential, considering that an ESL tag has limited battery life. Most ESL traffic is related to image data of a product displayed on the tag, and reducing the amount of data is the most effective way to increase communication performance and reduce retransmissions. When raw data is stored or transmitted without an alteration, a waste of storage space, transmission time, and bandwidth occur. Therefore, research and development of compression methods to reduce the data size is being conducted. Various techniques related to the compression and encryption of multiple types of data are being studied based on information theory.

However, although the prior art proposes various image compression methods to reduce the number of packets, the methods exhibit a low compression rate, long compression time, and low decompression performance.

SUMMARY

To solve the problem above, an object of the present disclosure is to provide an ESL management server and a method for controlling the ESL management server.

In particular, the present disclosure provides an image compression method that reduces the number of packets more than the conventional methods.

Also, an object of the present disclosure is to provide an ESL management server having a higher compression rate, shorter compression time, and better decompression performance than the prior art and a method for controlling the ESL management server.

An ESL management server for compressing an image to be displayed on an external display device of the ESL system according to one embodiment of the present disclosure comprises a communication unit obtaining an image including product information; and a processor applying a first pre-processing process to the image, chain coding the image to which the first pre-processing process has been applied, encoding a chain code and a chain code table obtained as a result of the chain coding into a bitstream, generating a compressed image file using the bitstream, and transmitting the compressed image file to the external display device through the communication unit, where the first pre-processing process converts data with a high local correlation within the image into a small integer but converts data with a small local correlation within the image into a large integer.

Also, the first pre-processing process uses Move-to-Front Transform (MTFT) algorithm.

Also, the integer is a binary integer.

Also, the processor converts the image into a symbol sequence and applies the first pre-processing process to the symbol sequence.

Also, the symbol sequence is a binary sequence.

Also, the processor separates the image into a plurality of mono-color images and converts the plurality of mono-color images into a plurality of symbol sequences.

Also, the processor converts white pixels among the pixels within the plurality of mono-color images into 0 and converts the remaining pixels into 1.

Also, the processor performs the image separation operation and the first pre-processing operation simultaneously.

Also, the processor performs chain coding on the pixels within the image in the downward direction from upper pixels to lower pixels.

Also, the processor obtains the chain code table as a result of the chain coding, classifies the respective items of the chain code table according to their types, and encodes the respective items of the chain code table into a bitstream based on the classification result.

Also, the processor encodes each item of the chain code table into a bitstream based on the frequency of each item type.

Also, the processor encodes each item of the chain code table into a bitstream based on the item length.

Also, the compressed image file includes at least one of the data bit length, width, height, type code, color palette size, and chain code table size.

A method for controlling an ESL management server according to another embodiment of the present disclosure comprises obtaining an image including product information; applying a first pre-processing process to the image; chain coding the image to which the first pre-processing has been applied; encoding a chain code and a chain code table obtained as a result of the chain coding into a bitstream; generating a compressed image file using the bitstream; and transmitting the compressed image file to an external display device through the communication unit, where the first pre-processing process converts data with a high local correlation within the image into a small integer but converts data with a small local correlation within the image into a large integer.

A display device according to yet another embodiment of the present disclosure comprises a communication unit obtaining a compressed image file; and a processor parsing the header of the image file, decoding transformed chain code tables of the image file, decoding adjoining chain codes of the image file, and performing the inverse of a first pre-processing process on the image file.

Also, the inverse of the first pre-processing process is the inverse of Move-to-Front Transform (MTFT) algorithm.

Also, the integer is a binary integer.

Also, the processer converts 0s in a plurality of symbol sequences included in the image file into white pixels and 1s in the plurality of symbol sequences into pixels of another pre-configured color.

Also, the symbol sequence is a binary sequence.

Also, the processor decodes adjoining chain codes of the image file in the downward direction from upper pixels to lower pixels of the image file.

Advantageous Effects

Since the ESL management server and the method for controlling the ESL management server according to the present disclosure may reduce the number of packets required for communication between constituting elements through highly efficient image compression, product information to be displayed on a tag may be updated according to identical and accurate scheduling through a link between tags.

Also, since the ESL management server and the method for controlling the ESL management server according to the present disclosure may quickly display a changed price, dynamic pricing is possible.

Also, since the present disclosure may reduce the number of packets required for communication between constituting elements through highly efficient image compression, the power consumption of a tag receiving information may be reduced.

Also, since the present disclosure implements a low power system, the present disclosure may save costs and labor required for producing and substituting tag power.

Also, since the present disclosure minimizes the replacement cost, the present disclosure may increase the convenience of managing product information.

4

Figure 2:
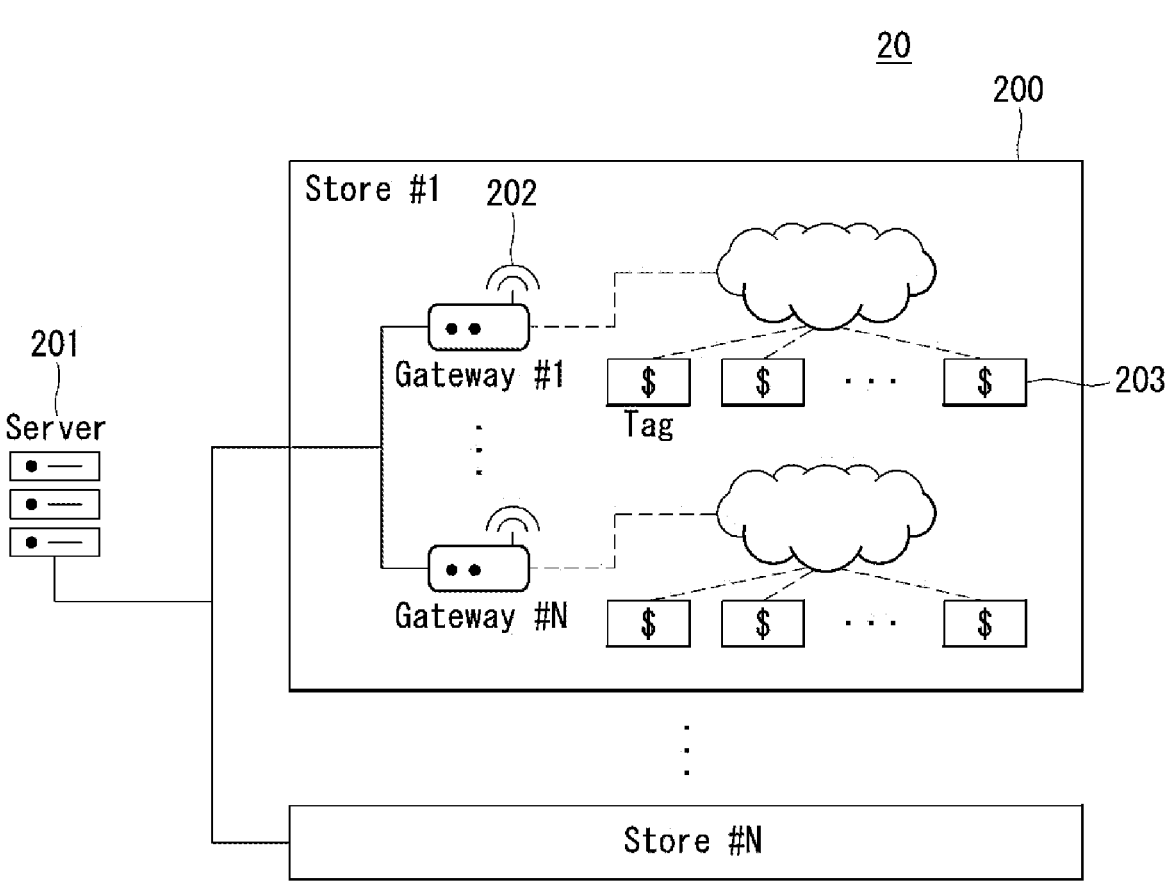

FIG. 2 illustrates a wireless network structure of an ESL system according to an embodiment of the present disclosure.

Figures 3, 4:
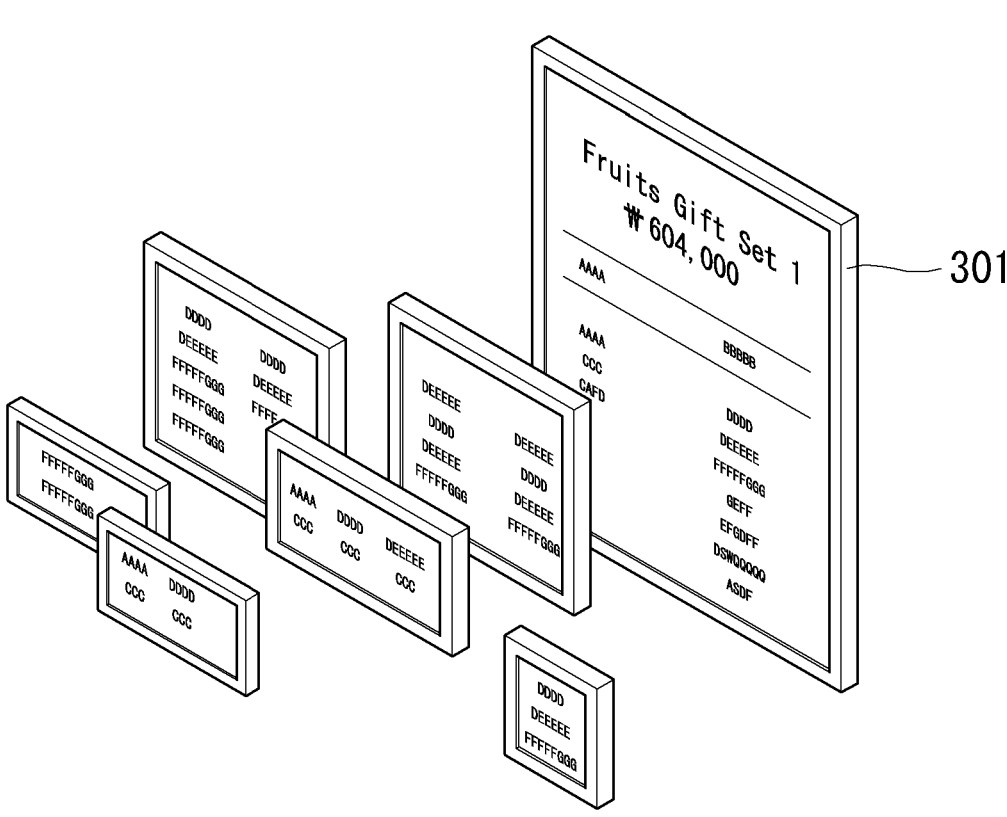

FIG. 3 shows an example of a tag displaying an image.

FIG. 4 shows an example of an MTFT process according to an embodiment of the present disclosure.

Figure 5:
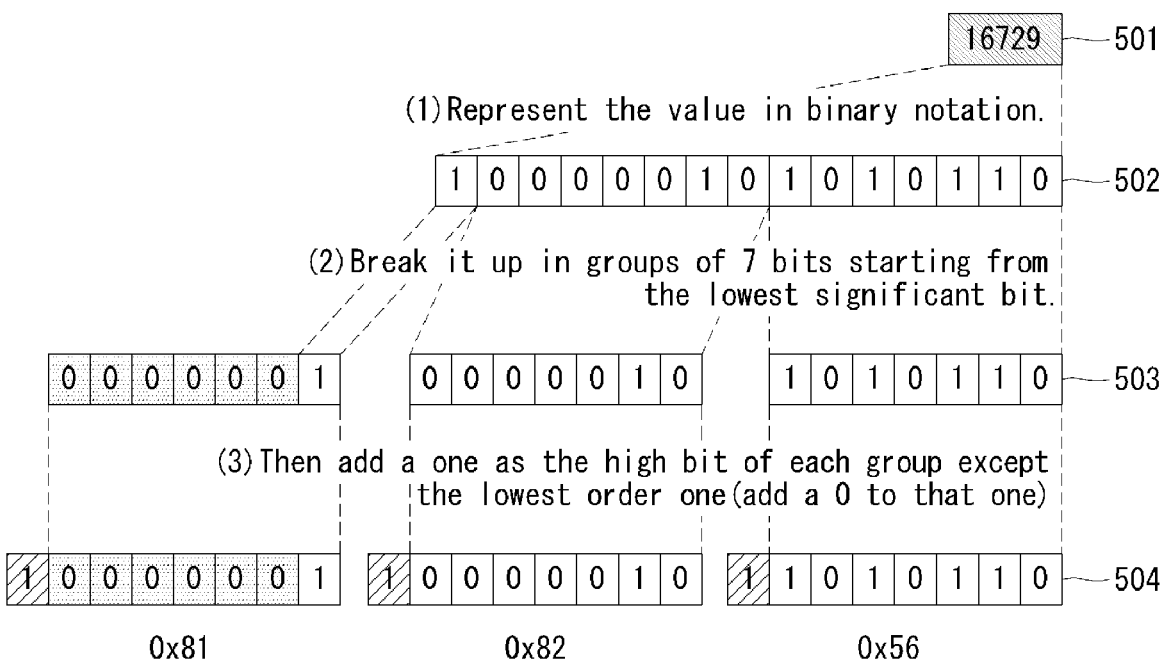

FIG. 5 is a diagram illustrating a method for converting 16,729 from decimal to base-128 representation.

Figure 6:
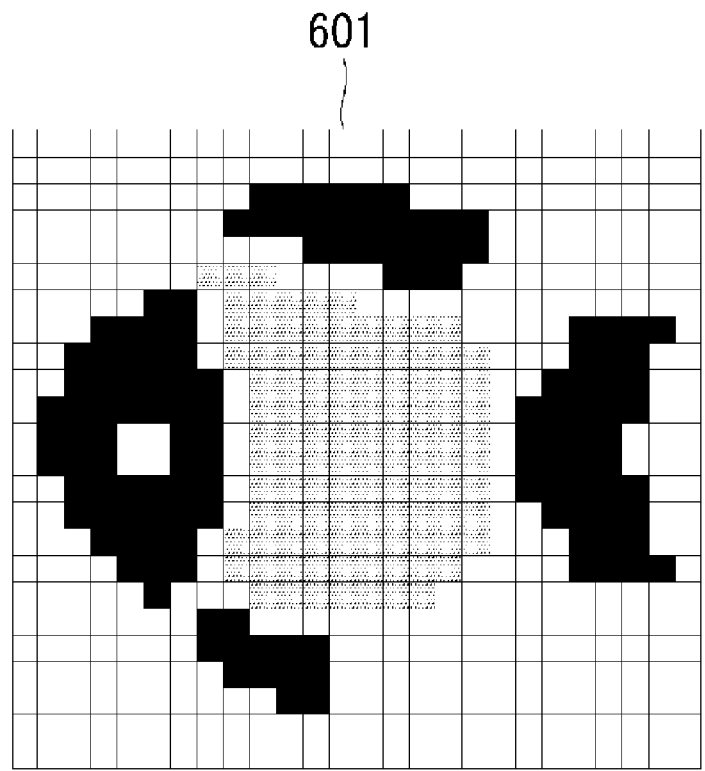

FIG. 6 shows a 26 px×24 px test image to which the present disclosure is applied.

Figure 7:
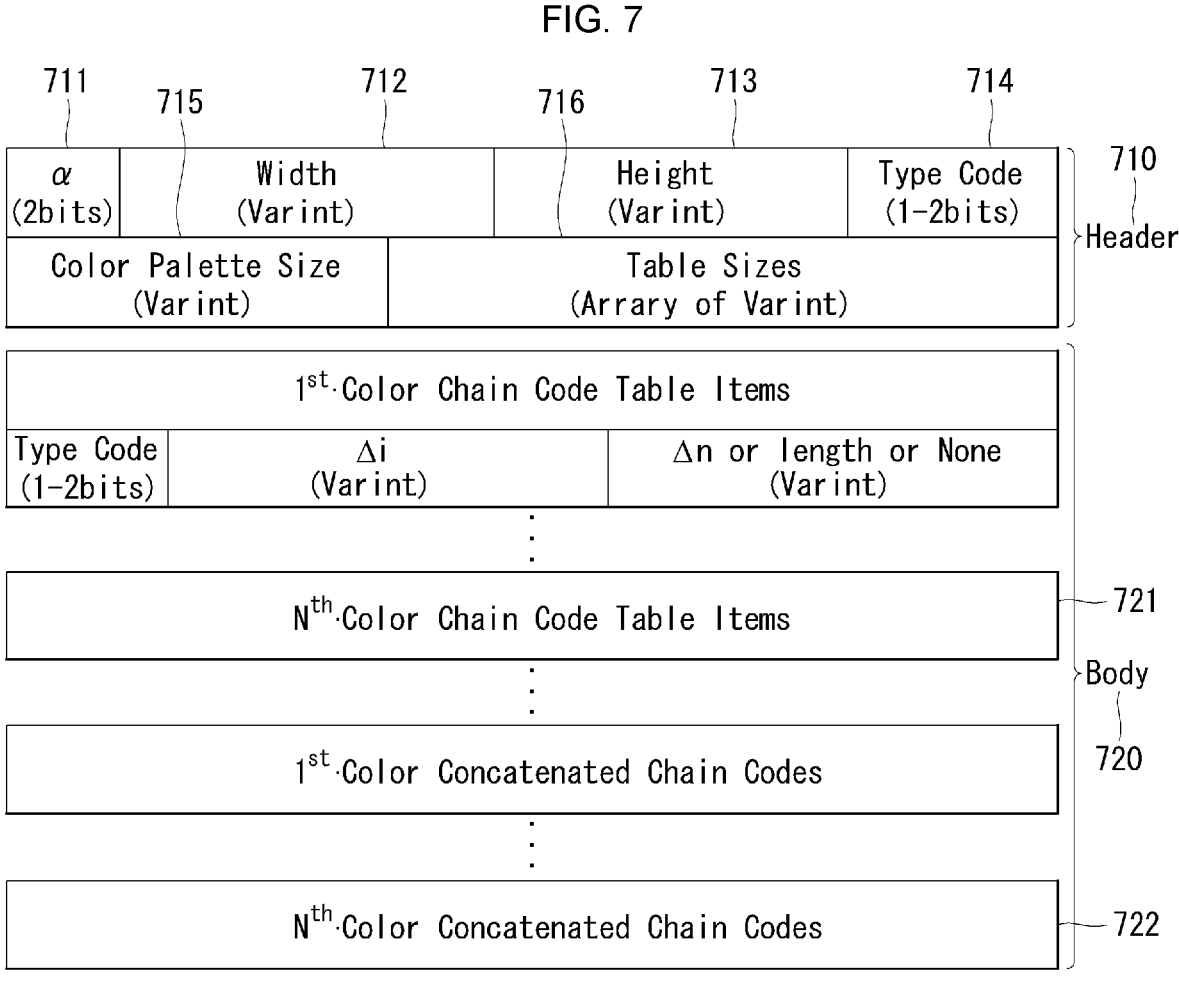

FIG. 7 illustrates a structure of an image file compressed according to the ECO of the present disclosure.

Figure 8:
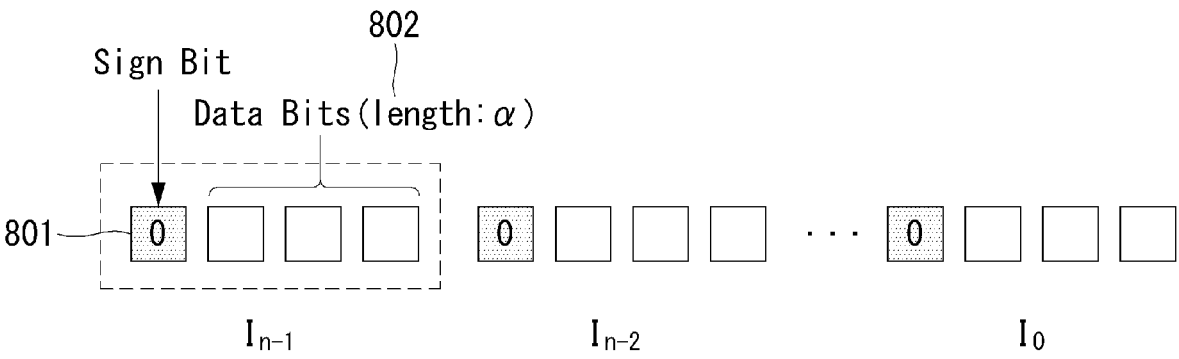

FIG. 8 illustrates a structure of a variable-length code.

FIG. 9 is a flow diagram illustrating an image compression method according to an embodiment of the present disclosure.

FIG. 10 illustrates a process in which the test image of FIG. 6 is changed according to the binary MTF step of FIG. 9.

Figure 11:
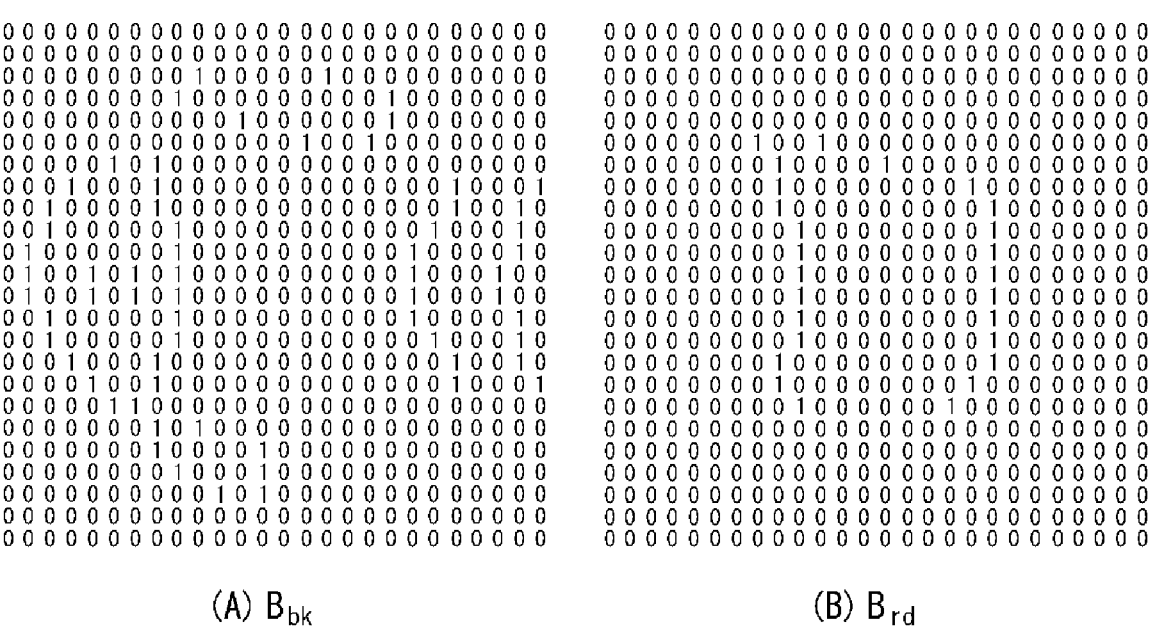

FIG. 11 illustrates a bitstream obtained by the color separation and binary MTFT step of FIG. 9.

Figure 12:
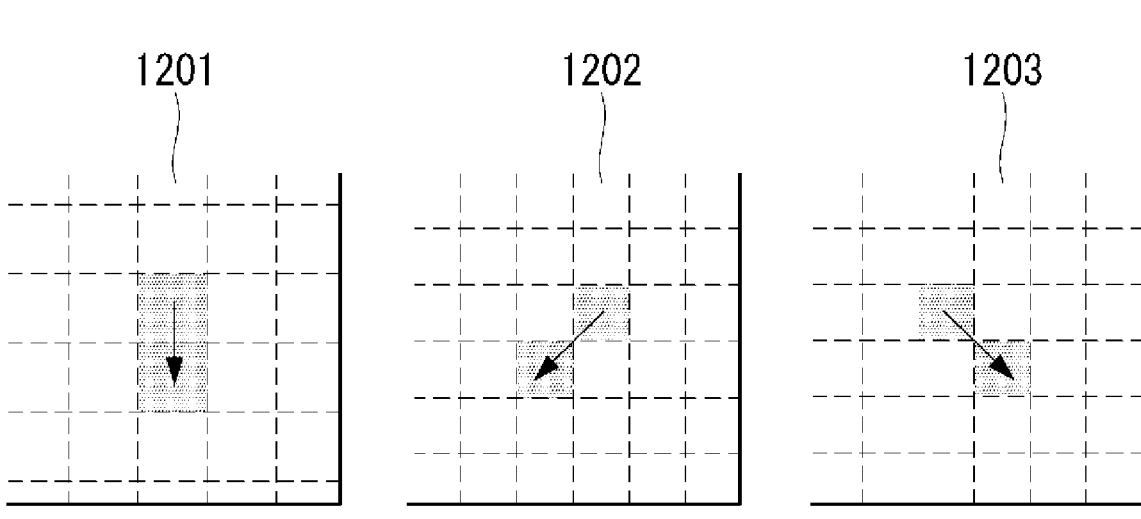

FIG. 12 illustrates symbols encoded in the downward direction.

Figures 13, 14:
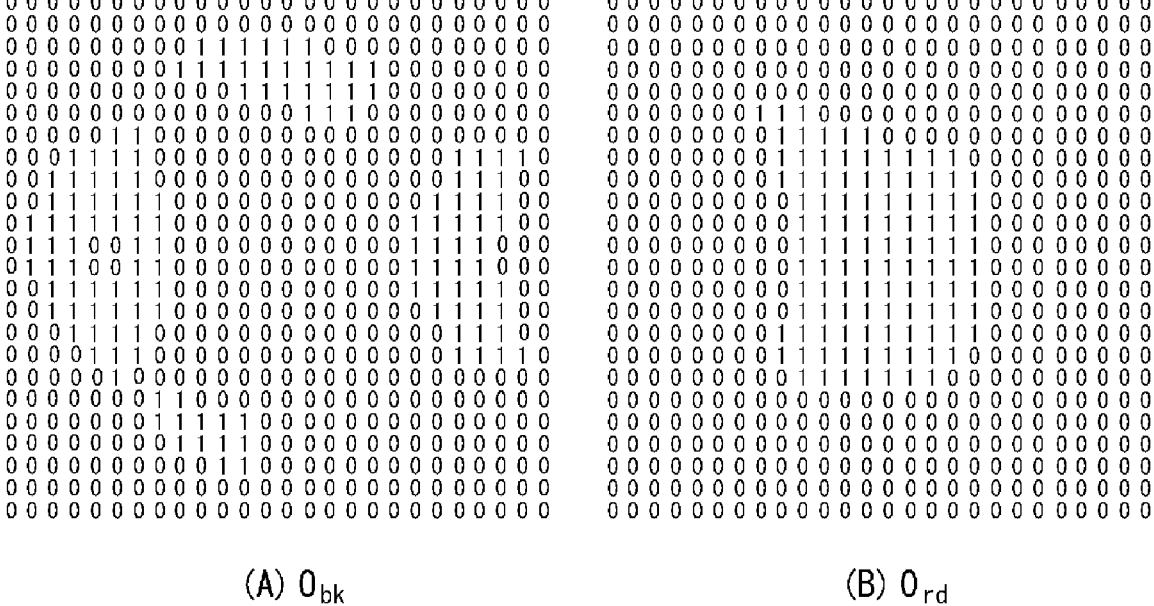

FIG. 13 is a flow diagram illustrating a decompression process according to an embodiment of the present disclosure.

FIG. 14 illustrates $O_{bk}$ and $O_{rd}$ generated through the reverse binary MTFT.

Figure 15:
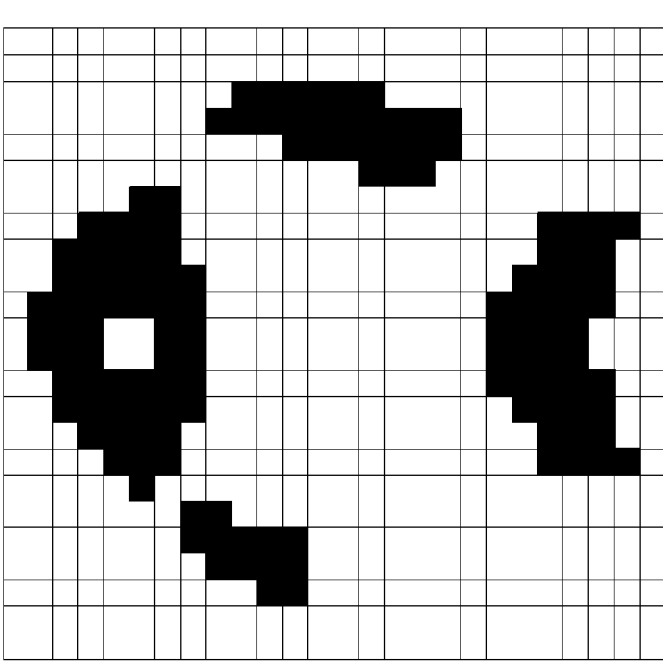

FIG. 15 illustrates an image generated through the reverse binary MTFT.

Figure 16:
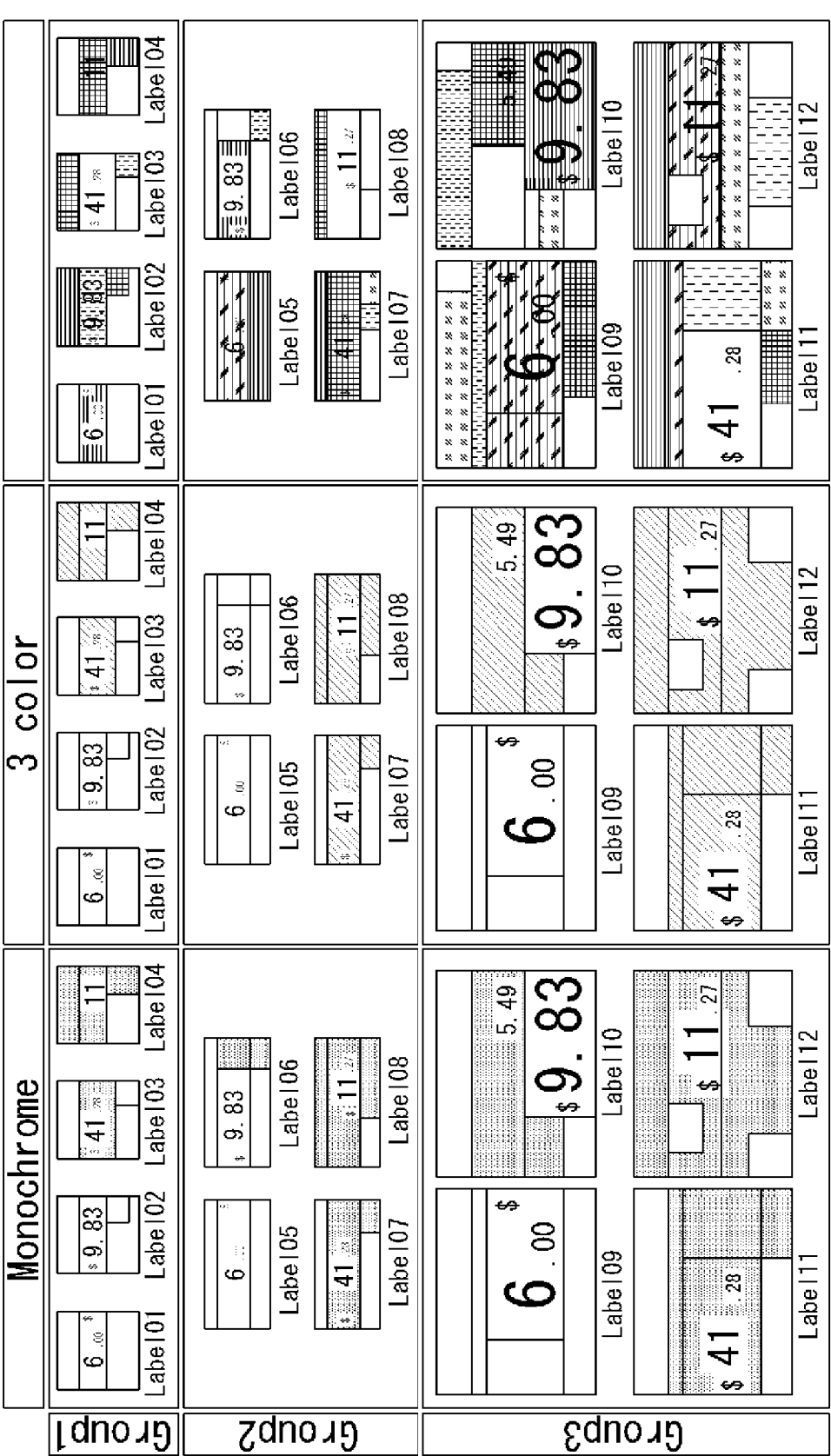

FIG. 16 is a test image used for testing performances of six compression algorithms of the present disclosure.

Figure 17:
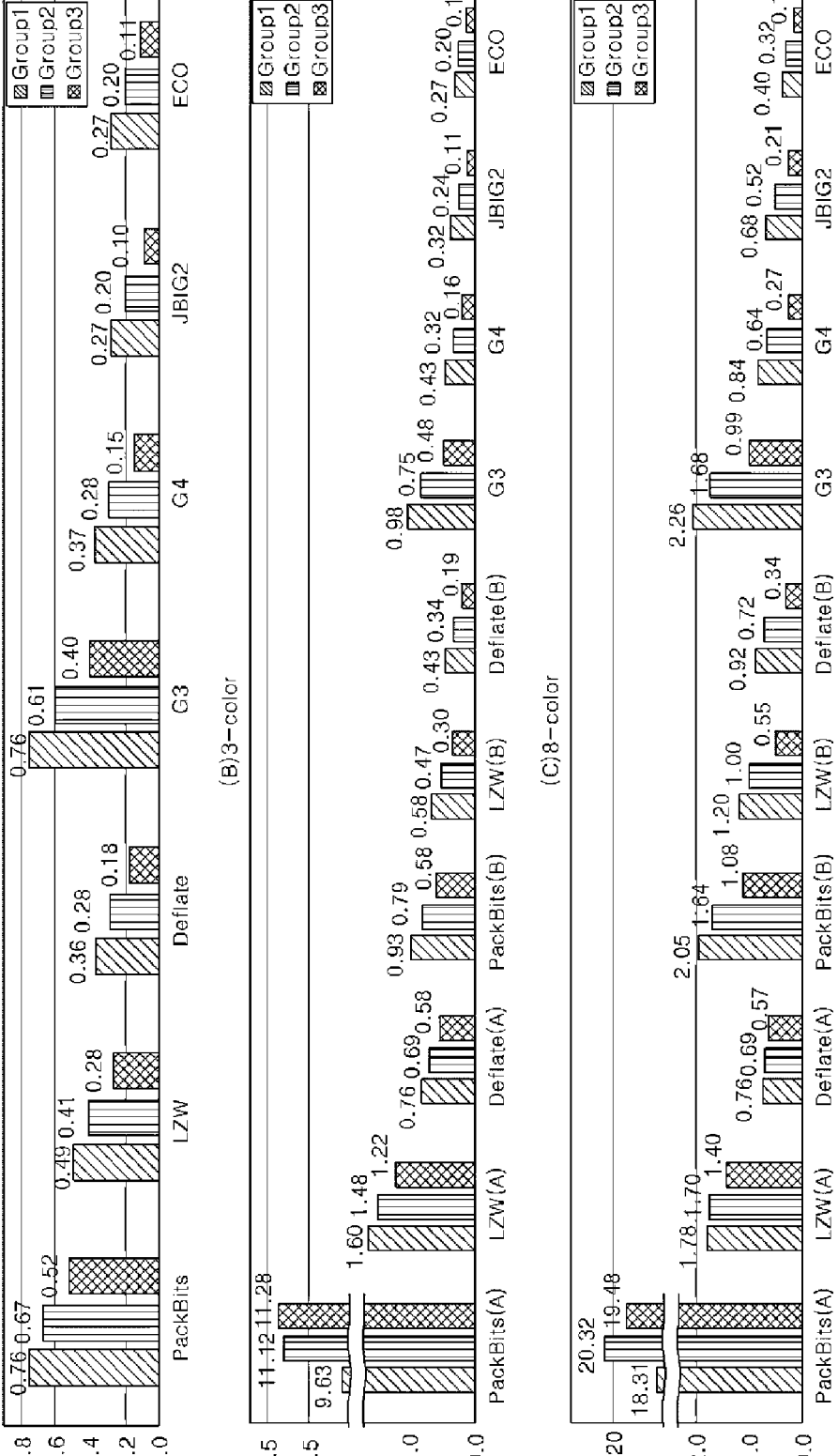

FIG. 17 shows the average bits per pixel of each group.

Figure 18:
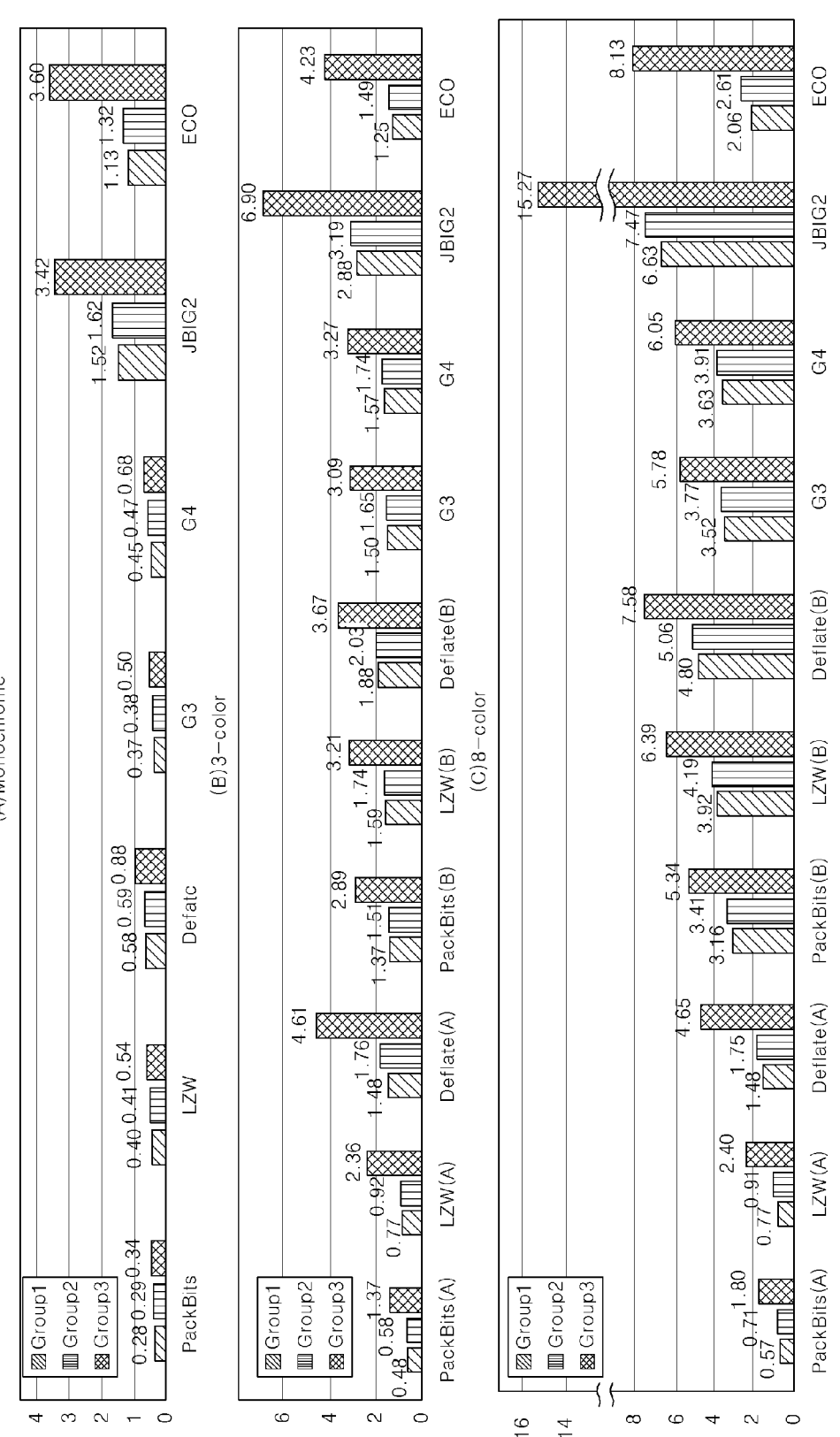

FIG. 18 shows average compression time of each group.

Figure 19:
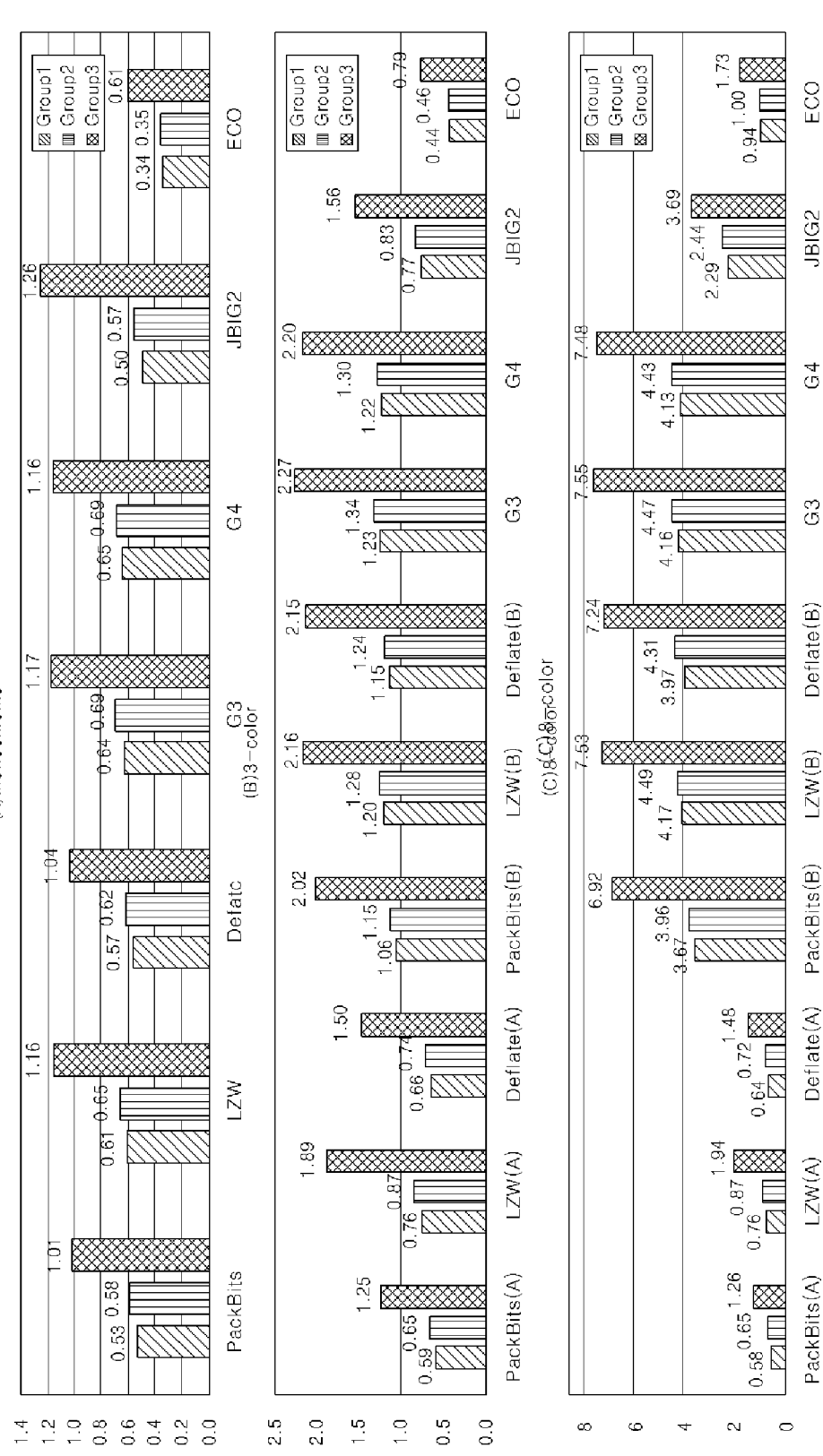

FIG. 19 shows average decompression time of each group.

Figure 20:
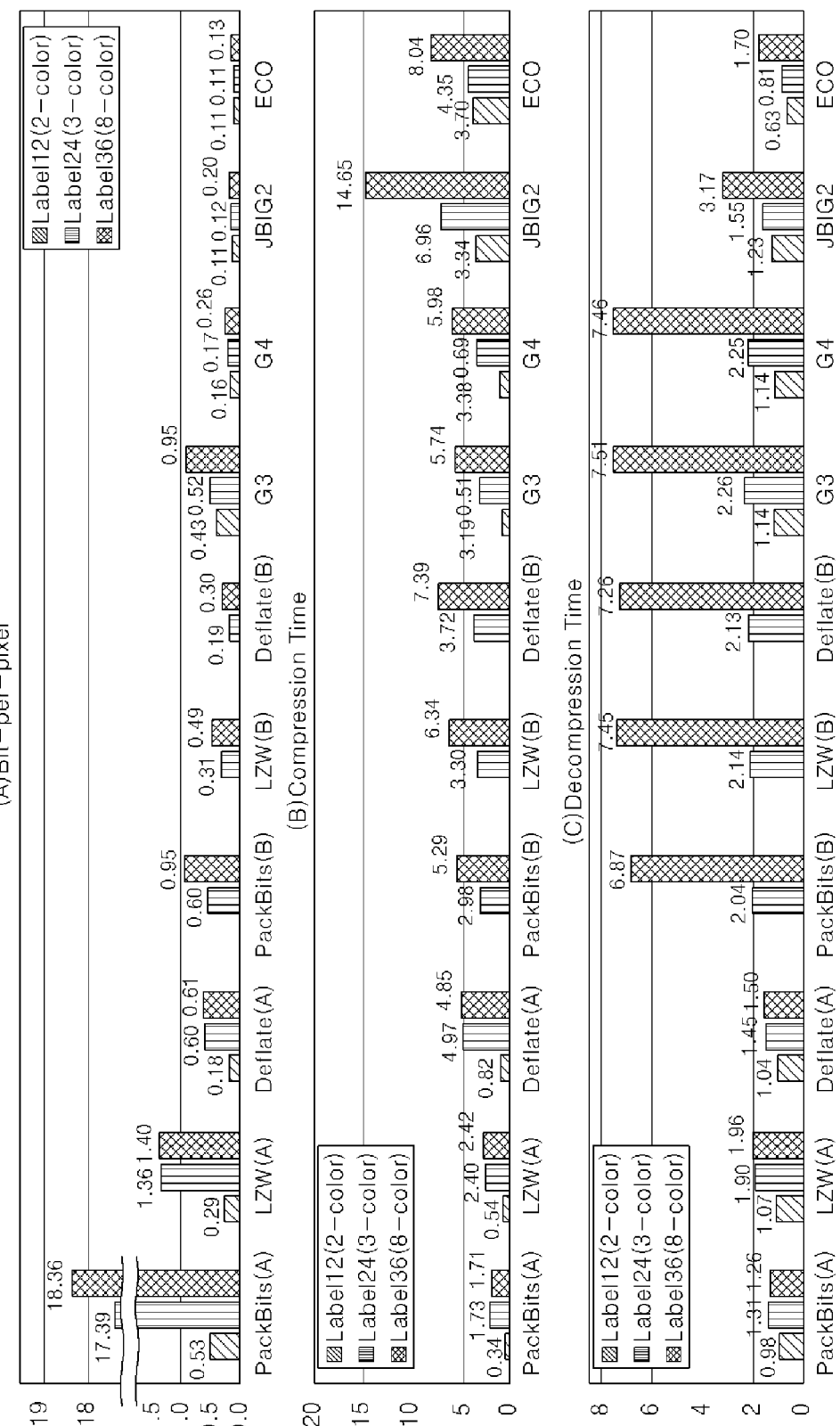

FIG. 20 shows a performance measurement result for images of the same type in different colors.

DESCRIPTION OF EXEMPLARY EMBODIMENTS

Definition of Terms

In what follows, embodiments of the present disclosure will be described in detail with reference to appended drawings, where the same or similar constituting elements are given the same reference number irrespective of their drawing symbols, and repeated descriptions thereof will be omitted.

In describing an embodiment of the present disclosure, if a constituting element is said to be "connected" or "attached" to a different constituting element, it should be understood that the former may be connected or attached directly to the different constituting element, but another constituting element may be present between the two elements.

Also, in describing an embodiment of the present disclosure, if it is determined that a detailed description of a related art incorporated herein unnecessarily obscures the gist of the embodiment, the detailed description thereof will be omitted. Also, it should be understood that the appended drawings are intended only to help understand the embodiments of the present disclosure and do not limit the technical principles and scope of the present disclosure; rather, it should be understood that the appended drawings include all of the modifications, equivalents, or substitutes belonging to the technical principles and scope of the present disclosure.

Meanwhile, the term disclosure may be replaced with a term such as document, specification, or description.

[Method for Controlling an ESL Management Server]

Figure 1:
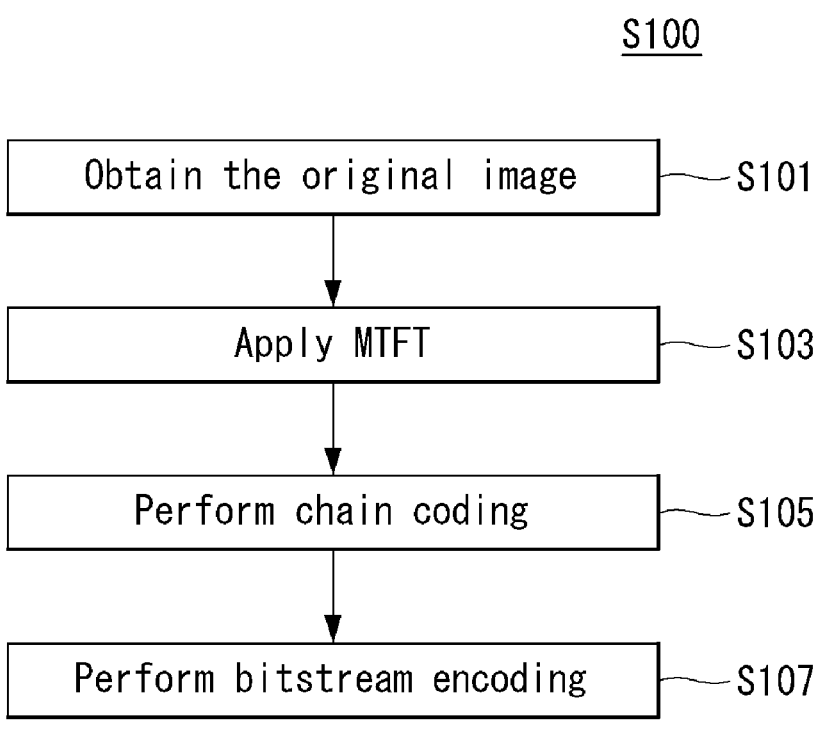
FIG. 1 illustrates a method for controlling an ESL management server according to an embodiment of the present disclosure.

FIG. 1 illustrates a method for controlling an ESL management server according to an embodiment of the present disclosure.

As shown in FIG. 1, a method S100 for controlling an ESL management server according to an embodiment of the present disclosure includes S101 to S107 steps, of which the detailed descriptions are given below.

First, the management server obtains the original image including product information S101.

Here, the original image may have a color palette the size of which is N.

Next, the management server applies MTFT to the original image obtained S103.

Specifically, the management server separates the original image into a plurality of mono-color images, where the management server extracts one image for each separated color component.

Next, the management server converts a plurality of mono-color images into a character string. Here, the management server may adjust white pixels within the plurality of mono-color images into 0 and adjust the remaining pixels into 1.

A symbol sequence may substitute for a character string in the present disclosure, but the present disclosure is not necessarily limited to the specific example. In other words, the management server may convert a plurality of mono-color images into a symbol sequence rather than a character string or may convert the plurality of mono-color images into a character string.

Next, the management server obtains a bitstream by applying the MTFT to the obtained character string. Here, the MTFT may be binary MTFT. Here, the management server may perform the color separation and binary MTFT within one cycle.

Next, the management server performs chain coding to the image S105.

For example, the management server obtains adjoining chain codes by performing chain coding to the bitstream within the image in the downward direction from upper pixels to lower pixels.

Here, the management server obtains a chain code table as a result of the chain coding. Then, the management server classifies each item of the chain code table into A, B, or C type and transforms each item of the chain code table based on the classification result.

Lastly, the management server encodes the bitstream S107.

Specifically, the management server encodes the chain code table and adjoining chain codes transformed through the S105 step. For example, the management server encodes each item of the transformed chain code table into a bitstream in the order of type or length. For example, the management server determines the item type showing the highest frequency among the items and encodes each item into a bitstream based on the frequency of each type.

The management server may transmit the encoded bitstream into an external tag through wireless communication. In the present disclosure, the external tag may be defined as a display device.

[Electronic Shelf Label System]

An ESL system comprises a management server, gateways, and tags as shown in FIG. 2.

FIG. 2 illustrates a wireless network structure of an ESL system according to an embodiment of the present disclosure.

As shown in FIG. 2, an ESL system 20 comprises a management server 201, a plurality of gateways 202, and a plurality of tags 203, where a plurality of tags and a gateway are disposed in one store 200.

The management server manages all of the information used for the whole ESL system, such as product information displayed on each tag and a list of tags communicating with each gateway.

The gateway forms a wireless network and manages tags that have joined the network. Also, the gateway supports communication between the server and tags and serves as an intermediary between servers.

The tag may receive an image from the gateway and display the received image on the screen. The tag may operate in synchronization with the gateway. When the tag has no more task to do, the tag enters sleep mode to minimize power consumption.

FIG. 3 shows an example of a tag displaying an image.

The image displayed on the tag 301 is designed to deliver product information to customers effectively. The image displayed on the tag consists of a small number of colors.

As shown in FIG. 3, the image uses two colors (black and white) or three colors (black, white, red, or yellow). Most areas of the image are text.

The tag displays essential information such as a product name, price, and discount information large and clear for customers to easily recognize the information. Also, the tag displays the product name, the price, and the discount information by emphasizing them with different text colors or different background colors.

On the other hand, as the number of colors expressed by an e-paper module increases, a tag's price and power consumption increase. For this reason, stores usually use tags that display only two or three colors.

[Move-To-Front Transform (MTFT) Algorithm]

The MTFT algorithm is a method to reduce the entropy of data and compress the data efficiently. The MTFT algorithm replaces the input data with an index of the stack, and the recently used symbol is moved to the beginning of the stack.

FIG. 4 shows an example of an MTFT process according to an embodiment of the present disclosure.

As shown in FIG. 4, for example, when "ABBBCBBBB" 401 is entered to the MTFT algorithm of the management server, the management server converts the sequence into "01011021000".

Meanwhile, the MTFT algorithm is used to more efficiently reduce entropy in conjunction with Burrows-Wheller Transform (BWT).

[Chain Coding Algorithm]

The chain coding algorithm encodes the connectivity direction between pixels forming the boundary of an image object. An algorithm such as RLE or Huffman Coding is generally used to compress the encoded chain code.

Freeman chain code of eight directions (FCCE) represents directions of eight neighbor pixels in each symbol. The higher the number of symbols, the greater the number of bits are required to encode each symbol, resulting in chain code algorithms with fewer symbols. Among them is the vertex chain code (VCC), which uses three symbols to encode the number of boundary pixels adjacent to a vertex.

Three orthogonal symbol chain code (3OT), another algorithm in the prior art, determines a symbol according to the direction of a previous encoding direction. A method for controlling a management server according to an embodiment of the present disclosure uses three symbols, the detailed descriptions of which will be given later.

[Variable-Length Integer Encoding (Varint) Algorithm]

FIG. 5 is a diagram illustrating a method for converting 16,729 from decimal to base-128 representation.

As shown in FIG. 5, Variable-length integer encoding (Varint) is an algorithm that saves space by compressing fixed-length integers 501 into variable-length integers 502, 503, 504.

Base-128 according to the prior art is an example of the algorithm mentioned above.

[Other Compression Algorithms]

The present disclosure includes a performance comparison of six compression algorithms. Among the six compression algorithms, the PackBits, Lempel-Ziv-Welch (LZW), and Deflate algorithms have no restriction on the type of input data. However, the JBIG2 algorithm, the CCITT G3 algorithm, and the G4 algorithm may use only input monochrome images.

The description of each algorithm is as follows.

1) PackBits Algorithm

The PackBits algorithm is a fast and simple compression algorithm based on Run-Length Encryption (RLE). RLE may effectively compress data containing consecutive symbols, but otherwise, the compression result may be larger than the original data.

2) Lempel-Ziv-Welch Algorithm

The Lempel-Ziv-Welch (LZW) algorithm is a lossless data compression algorithm developed by Abraham Lempel, Jacob Ziv, and Terry Welch. The LZW algorithm was published in 1984, an improved version of the LZ78 algorithm published in 1978 by Lempel and Ziv. The LZW algorithm is simple to implement and may achieve very high throughput when implemented in hardware.

The LZW algorithm registers a repeated bit sequence in a dictionary and replaces the repeated pattern with the dictionary's index code. Here, the generated dictionary does not need to be sent to a decoder but is reconstructed during the decoding process.

3) Deflate Algorithm

The Deflate algorithm is a lossless data compression algorithm that uses a combination of the LZSS algorithm and the Huffman coding. The Deflate algorithm was designed by Phil Katz and specified in RFC 1951.

The data format compressed by the Deflate algorithm consists of a series of blocks corresponding to a series of input data blocks. Each block is compressed using the LZSS algorithm and the Huffman coding.

4) JBIG2 Algorithm

The JBIG2 algorithm is a compression algorithm for binary images developed by the Joint Bi-level Image Experts Group.

The JBIG2 algorithm supports both lossy and lossless compression. The JBIG2 algorithm in lossless mode typically achieves three times higher compression than the CCITT Group4 compression algorithm and two to four times higher compression than the JBIG algorithm, the previous bi-level compression standard published by the group.

5) CCITT G3 and G4 Algorithm

The CCITT G3 and G4 algorithms are compression techniques developed by the International Telegraph and Telephone Competitive Committee. The International Telephone Competition Committee is a standard developing organization that has developed protocols for transmitting monochrome images over telephone lines and data networks.

The encoding and decoding of the G3 algorithm are fast and maintain a decent compression ratio for various document data. Also, the encoded data contains data that allows the G3 decoder to detect and correct an error.

The G4 algorithm compresses monochrome images more efficiently. Data compressed with the G4 algorithm occupies only half the size of data compressed with the one-dimensional G3 algorithm. Although the G4 algorithm is quite difficult to implement efficiently, it encrypts data as fast as the G3 at the least and sometimes decrypts data more quickly than the G3. The G4 does not include a synchronization code used to detect errors. These algorithms are not adaptive and do not adjust the encoding algorithm to encode each bitmap with optimal efficiency.

[the Proposed Method: ESL Image Compression (ECO)]

A method for controlling a management server according to the present disclosure deals with images used in an ESL system. Images include text, barcodes, and simple drawings. In most case, text occupies a large portion of an image.

Also, an image consists of two or three colors. In what follows, compression and decompression processes of the ECO will be described in detail, and processes related to the proposed method of the present disclosure will be described with reference to FIG. 6.

FIG. 6 shows a 26 px×24 px test image to which the present disclosure is applied.

As shown in FIG. 6, many fields of the compressed file format 601 according to the proposed method of the present disclosure are represented in the Varint format. The Varint format in the present disclosure is composed of a series of chunks comprising a sign bit and data bits, as shown in FIG. 8, which will be described later. If a current chunk is not the last chunk, the sign bit is 0, and for the last chunk, the sign bit is 1. The $\alpha$-length data bit may represent an integer of $2^\alpha$.

Eq. 1 below shows the range of an integer that a single chunk may express.

$$1 \le I_i \le 2^\alpha \quad (0 \le i \le n) \qquad \text{[Eq. 1]}$$

Since the integer used in the ECO is always greater than 0, the minimum value $I_i$ is 1. The integer encoded in the Varint may be decoded using Eq. 2.

$$\sum_{i=0}^{n-1} (I_i \cdot 2^{\alpha i}) \qquad \text{[Eq. 2]}$$

Table 1 is an example in which decimal values are expressed in the Varint format.

TABLE 1

| Decimal | Encoded as |
|---------|------------|
| 1 | 10 |
| 2 | 11 |
| 3 | 0010 |
| 6 | 0111 |
| 7 | 000010 |
| 14 | 010111 |
| 15 | 00000010 |
| 30 | 01010111 |
| 31 | 0000000010 |
| 62 | 0101010111 |
| 63 | 000000000010 |
| 126 | 010101010111 |

TABLE 1-continued

| Decimal | Encoded as |
|---------|------------|
| 127 | 00000000000010 |
| 254 | 01010101010111 |
| 255 | 0000000000000010 |
| 510 | 0101010101010111 |
| 511 | 00000000000000010 |
| 1022 | 010101010101010111 |
| 1023 | 0000000000000000010 |
| 2046 | 01010101010101010111 |

FIG. 7 illustrates a structure of an image file compressed according to the ECO of the present disclosure.

As shown in FIG. 7, an image file compressed by the ECO according to the proposed method of the present disclosure comprises a header 710 and a body 720.

Specifically, the header comprises α711, Width 712, Height 713, Type Code 714, Color Palette Size 715, and Table Sizes 716 fields.

Also, the body comprises the $N^{th}$ Color Chain Code Table Item 721 and $N^{th}$ Color Concatenated Chain Codes 722 fields.

α is the length of data bits in the variable-length integer encoding described in Section II-D. α consists of two bits and represents a value in the range of 1 to 4, as shown in Table 2.

TABLE 2

| α | Bit Represetation |
|---|-------------------|
| 1 | 00 |
| 2 | 01 |
| 3 | 10 |
| 4 | 11 |

The width and height of an image are expressed in the Varint format.

There are three types of chain code table items, and depending on which type has the most items, the type code is displayed in 1 or 2 bits, as shown in Table 3 below. The format will be described later.

FIG. 8 illustrates a structure of a variable-length code.

As shown in FIG. 8, the Varint format comprises of a series of chunks consisting of a sign bit 801 and data bits 802. If a current chunk is not the last chunk, the sign bit is 0, and for the last chunk, the sign bit is 1. The length data bit a may represent an integer of $2^{\alpha}$.

TABLE 3

| The most frequent type | Bit Representation |
|------------------------|--------------------|
| A | 0 |
| B | 10 |
| C | 11 |

The color palette represents the color range of an image. The white color is the default color and is not counted in the size of the color palette. For example, the color palette size of FIG. 5 is 2.

The color palette of an image used in the present disclosure is shown in Table 4. The color palette size of an image may also be expressed in the Varint format.

TABLE 4

| Type | Size | Colors |
|------|------|--------|
| Monochrome | 1 | Black |
| 3-color | 2 | Black, Red |
| 8-color | 7 | Black, Red, Blue, Orange, Magenta, Green, Yellow |

The table size is a Varint array that stores the number of chain code table items for each color. A positive value of 1 is stored because the number of table items may be zero.

A. Compression Technology

FIG. 9 is a flow diagram illustrating an image compression method according to an embodiment of the present disclosure.

As shown in FIG. 9, the compression process is carried out in four steps.

First, the management server separates colors of the original image containing product information and having a color palette size of N and performs the binary MTFT on the color-separated image S901.

In the S901 step, the management server separates an image into several mono-color images. In other words, each color plane of the image is separated into one image. After that, a plurality of mono-color images are converted into character strings. The mono-color image is converted to a character string, and each pixel of the image is changed to 0 when the pixel color is white and is changed to 1 otherwise. The management server applies binary MTFT to the obtained character string. Since the MTFT according to the present disclosure deals only with a character string composed of two symbols, it may be called binary MTFT. A pseudo algorithm of the above process is shown in Table 5 below.

TABLE 5

Algorithm 1: Color Separation and Binary MTFT

```
Input   : A pixel array P of an image
Output: A array C[0..N] of bitstreams
/* N is color palette size              */
1 prev ← −1
2 C[0..N] ← 0
3 for i ← 0 to P.length do
4  |   idx ← Index of P[i] in color palette
5  |   for j ← 0 to N do
6  |   |   If j is not idx then
7  |   |   |   If prev = j then
8  |   |   |   |   C[j][i] ← 1
9  |   |   else if prev is not j then
10 |   |   |   C[j][i] ← 1
11 |   end
12 |   prev ← idx
13 end
```

FIG. 10 illustrates a process in which the test image of FIG. 6 is changed according to the binary MTF step of FIG. 9.

As shown in FIG. 10, the management server performs color separation 1001 and binary MTFT 1002 in one cycle.

FIG. 11 illustrates a bitstream obtained by the color separation and binary MTFT step of FIG. 9.

As shown in FIG. 11, after the color separation and binary MTFT, white pixels are set to 0, and other pixels are set to 1.

Next, the management server performs chain code encoding on the image S903.

The management server may encode the bitstream obtained in the S901 step using the chain code in the S903 step.

FIG. 12 illustrates symbols encoded in the downward direction.

As shown in FIG. 12, the management server performs encoding using the chain code only in three directions 1201, 1202, 1203 within an image. Since the progress direction of encoding is from top-left to bottom-right of an image, only the downward directions are required for the chain code.

Also, after running the binary MTFT, the probability of encoding in the left and right directions of a pixel is very low.

A pseudo algorithm of the above chain code encoding process is shown in Table 6 below.

TABLE 6

| Algorithm 2: Downward Direction Chain Code |
| --- |
| Input : A bitstream B of a monocolor image |
| Output: Chain code table T |
| /* W is the width of the image       */ |
| 1 c ← 0 |
| 2 L ← B.length |
| 3 for i ← 0 to L do |
| 4  \|  if B[i] is 1 then |
| 5  \|  \|  B[i] ← 0 |
| 6  \|  \|  T[c].i ← i |
| 7  \|  \|  T[c].code ← empty |
| 8  \|  \|  j ← i |
| 9  \|  \|  while j < L do |
| 10  \|  \|  \|  K ← j + W |
| 11  \|  \|  \|  if K < L and B[K] = 1 then |
| 12  \|  \|  \|  \|  B[K] ← 0 |
| 13  \|  \|  \|  \|  T[c].code = T[c].code + 0 |
| 14  \|  \|  \|  \|  j ← K |
| 15  \|  \|  \|  else if K − 1 < L and B[K − 1] = 1 then |
| 16  \|  \|  \|  \|  B[K − 1] ← 0 |
| 17  \|  \|  \|  \|  T[c].code = T[c].code + 1 |
| 18  \|  \|  \|  \|  j ← K − 1 |
| 19  \|  \|  \|  else if K + 1 < L and B[K + 1] = 1 then |
| 20  \|  \|  \|  \|  B[K + 1] ← 0 |
| 21  \|  \|  \|  \|  T[c].code = T[c].code + 2 |
| 22  \|  \|  \|  \|  j ← K + 1 |
| 23  \|  \|  \|  else |
| 24  \|  \|  \|  \|  break |
| 25  \|  \|  end |
| 26  \|  \|  c ← c + 1 |
| 27 end |

If the algorithm of Table 6 is applied to the output of the S901 step, a chain code table as shown in Table 7 is generated.

TABLE 7

| No. | i | Code |
| --- | --- | --- |
| 1 | 61 | 1 |
| 2 | 67 | — |
| 3 | 96 | 01 |
| 4 | 115 | — |
| 5 | 144 | — |
| 6 | 161 | — |
| 7 | 163 | 00200000101202 |
| 8 | 185 | 1010020222 |
| 9 | 203 | 011000220 |
| 10 | 207 | 100102002 |
| 11 | 290 | 0 |
| 12 | 292 | 0 |
| 13 | 477 | — |
| 14 | 506 | 00 |
| 15 | 556 | — |
| 1 | 137 | 200200000102 |
| 2 | 140 | — |
| 3 | 169 | — |
| 4 | 199 | 2000000011 |

Then, the management server transforms the chain code table of the chain code encoded image S905.

The management server pre-processes the chain code table before converting the chain code table obtained in the S903 step to a bitstream. First, the management server classifies each item in the table according to Table 8 below.

TABLE 8

| Type | Condition |
| --- | --- |
| A | The length of the code is 0 |
| B | Some of the previous items have the same code |
| C | Otherwise |

For example, the codes of the 2nd, 4th, 5th, 6th, 13th, and 15th items in $CT_{bk}$ are empty. Therefore, the type of these items is A.

Similarly, the type of the 2nd and 3rd items in $CT_{rd}$ is A. The code of the $12^{th}$ item of $CT_{bk}$ is the same as that of the $11^{th}$ item. Therefore, the type of the 12th item is type B.

The type of the others is C.

Next, the management server calculates Δi of each item in the chain code table using Eq. 3 below. Eq. 3 indicates that Δi is always an integer greater than zero, which is essential for VarInt encoding.

$$\Delta i_n = \begin{cases} i_n + 1, & \text{if } n = 1 \\ i_n - i_{n-1}, & \text{otherwise} \end{cases} \qquad [\text{Eq. 3}]$$

Next, the management server calculates Δn of the B type items and measures the code length of the C type items. The Δn is a number difference between the current and previous items of the same type.

As shown in Table 9 below, the management server acquires $TT_{bk}$ and $TT_{rd}$ from $CT_{bk}$ and $CT_{rd}$ through the steps described so far.

TABLE 9

| No | Type | Δi | Length | Δn | Encoded |
| --- | --- | --- | --- | --- | --- |
| 1 | C | 62 | 1 | — | 0 0101010111 10 |
| 2 | A | 6 | — | — | 10 0111 |
| 3 | C | 29 | 2 | — | 001010110 11 |
| 4 | A | 19 | — | — | 10 00010010 |
| 5 | A | 29 | — | — | 10 01010110 |
| 6 | A | 17 | — | — | 10 00000110 |
| 7 | C | 2 | 14 | — | 0 11 010111 |
| 8 | C | 22 | 10 | — | 0 00010111 00011 |
| 9 | C | 18 | 9 | — | 0 00000111 00011 |
| 10 | C | 4 | 9 | — | 0 0011 000110 |
| 11 | C | 83 | 1 | — | 0 000100010010 10 |
| 12 | B | 2 | — | — | 11 11 10 |
| 13 | A | 185 | — | — | 10 00010101000110 |
| 14 | C | 29 | 2 | — | 0 010101110 11 |
| 15 | A | 50 | — | — | 10 01000001 11 |

| No | Type | Δi | Length | Encoded |
| --- | --- | --- | --- | --- |
| 1 | C | 138 | 12 | 0 000000001000111 01001 |
| 2 | A | 3 | — | 10 0010 |
| 3 | A | 29 | — | 10 01010110 |
| 4 | C | 30 | 10 | 0 01010111 000111 |

Lastly, the management server combines the codes of the C type items into one. For example, the concatenated chain codes ($CC_{bk}$, $CC_{rd}$) obtained from $CT_{bk}$ and $CT_{rd}$ are as follows.

$CC_{bk}$=101002000001012021010020222011000220100102002000

$CC_{rd}$=2002000001022000000011

Finally, the management server may obtain a compressed image file by encoding and formatting a bitstream of the image S907.

The S907 step is the final stage of the image compression process. The transformed chain code tables and the concatenated chain codes are encoded as bitstreams, and the results are formatted as shown in FIG. 7. In the example of this step, the $\alpha$ is 1.

A-1: Method for Encoding Transformed Chain Codes as Bitstreams

The management server encodes each item in the transformed chain code table as a bitstream in order of type, $\Delta i$, $\Delta n$, or length.

Before encoding type, the management server identifies which type of items has the highest frequency and encodes the most frequent type as 0. The management server encodes the following type in the alphabetical order as 10 and other types as 11.

Subsequently, the management server encodes $\Delta i$, $\Delta n$, and length as Varint. For example, since the most frequent type among the items of Table 9 is C, the management server encodes the C type as 0, A type as 10, and B type as 11.

As a result, the table is encoded as follows.

E($TT_{bk}$)=0010101011110100111
00101011011100001001010010101101000000110011010111
00001011100011100000011100011000011000011000001
000100101011111101000010
10100011000101011011100100000111

E($TT_{rd}$)
=0000000001000111010011100010100101011000101
0111000111

A-2: Method for Encoding Concatenated Chain Codes to Bitstreams

The management server encodes concatenated chain codes into bitstreams using Table 10. The encoding result of the current symbol depends on the previous symbol.

TABLE 10

| | Current | | | |
|---|---|---|---|---|
| Prev | 0 | 1 | 2 | R |
| 0 | 0 | 10 | 11 | — |
| R | — | 0 | 1 | — |
| Other | 0 | 110 | 111 | 10 |

Also, the series of symbol 0 is abbreviated to symbol R if the length of the series is longer than $R_{min}$. $R_{min}$ is obtained by Eq. 4 below.

$$R_{min} = \alpha + 3 \qquad \text{[Eq. 4]}$$

Since the a used in the example is 1, $R_{mind}$ is 4. Therefore, the management server abbreviates the series of symbol 0 having a length more than four.

Meanwhile, behind the symbol R comes the VarInt encoded difference between the length of the symbol 0 series and the $R_{min}$. There is only one series in $CC_{bk}$, which is longer than 4, and the length of the series is 5. The series is consequently encoded as 1010.

$CC_{bk}$ and $CC_{rd}$ are finally encoded as bitstreams as follows.

E($CC_{bk}$)=11001000
11101000101110111100100011011111111110
1011000011111010001001100 1000

E($CC_{rd}$)=111001110100011111111000100110

A-3: File Format

In the present step, the management server creates a header and associates the header with a bitstream in the previous step to make a compressed file as shown in FIG. 7. For example, the header of FIG. 6 and the compression result of the header are as follows. In this example, the size is 358 bits, about 45 bytes.

Header=$\alpha$+VarInt(Width)=VarInt(Height)+Type
Code+VarInt(Color Palette Size)+VarInt(The
size of $TT_{bk}$+1)+VarInt(The size of $TT_{rd}$+1)

=00+01000111+01000011+11+11+00000011+0110

=0001000111010000111111000000110110

Comp(FIG. 6)=Header+E($TT_{bk}$)+E($TT_{rd}$)+E($CC_{bK}$)+
E($CC_{rd}$)=
0001000111010000111111000000110110001010101011
11010011100101011011110000
10010100101011010000001100110101110000101110
00111000000111000110000011
00011000001000100101011111101000010101000110 0
01010110111001000000111000
000001000111010011100010100101011000101011111
00011110010001101001011
101111001000110111111110101011000011111010001
0011001100011100011101000111111 11000100110

B. Decompression

FIG. 13 is a flow diagram illustrating a decompression process according to an embodiment of the present disclosure.

As shown in FIG. 13, the decompression process comprises the S1301 to S1307 steps, the detailed descriptions of which are given below.

First, a tag parses the header of a compressed image file S1301.

Specifically, first, the header of the Comp (FIG. 6) parses the value of a from the first two bits. Since the two bits are "00", $\alpha$ is 1. Second, the tag parses width and height. The width and height are encoded as Varint. Therefore, the tag splits the data in chunk units and reads the chunks until the first bit of a chunk is 1. As a result, the width is "01000111", and the height is "01000011". The tag decodes the two values using Eq. 2, which results in 26 and 24. Third, the tag reads two bits to find out the most frequent type of chain code table items. Since the two bits are "11", the most frequent type is C. This value is used when decoding chain code tables. Fourth, the tag parses the color palette size encoded as Varint. Since the encoded value is "11", the color palette size is 2. Fifth, the tag reads the table size as many times as the color palette size. In this case, since the color palette size is 2, the tag reads only two table sizes. The two read values are "00000011" and "0110", which are decoded into 16 and 5. If the values are reduced by 1, the size of a chain code table is obtained. As a result, the size of the first chain code table is 15, and the size of the second chain code table is 4.

Next, the tag decodes the transformed chain code tables S1303.

To get a transformed chain code table, the tag reads the transformed chain code table items repeatedly from the header in units of the table size. For example, since the sizes of the first and second tables have been recognized in the previous step, the tag parses as many items as the table size from the remaining data $R_{stage1}$.

$R_{stage\,1}$=00101010111101001
110010101101110000100101001010101101
000000110011010111

```
00001011100011100000011100011000011000110001
10000010001001010111110100010
10100011000101011011100100000110000000
01000110100110001010010110
00101011100011111001000111010001011011
110010001101111111101011100001111
10100010011001100111001110100011111000100110
```

The tag decodes the first item of the first transformed chain code table as follows. First, the bit part of type may be "0". This means that the most frequent type is C. Second, the tag parses $\Delta i$ encoded as Varint. The $\Delta i$ is "0101010111". Therefore, the $\Delta i$ is 62. Third, since the type of the corresponding item is C, the tag also parses Length. The bit part of Length is "10". Accordingly, the Length is 1. Now, the decoding of the first item is completed. The tag parses all of the items in the same way and obtains Table 9.

The remaining data $R_{stage2}$ is as follows.

$R_{stage\ 1}$=11001000111010001011110111
10010001101111111101011000011111010001001100 1
10001110011101000111111000100110

Next, the tag decodes the concatenated chain code S1305.

The remaining encoding part after the S1303 step is the concatenated chain code. Before decoding the concatenated chain code, the tag creates a bitstream in the same size as the image, initializes the bitstream to 0, and changes the bits of the bitstream to 1 according to the items of the transformed chain code table. Also, when needed for the corresponding process, the tag decodes the concatenated chain code incrementally using Table 10. A pseudo algorithm of the decoding process is shown in Table 11 below.

TABLE 11

Algorithm 3: Decoding concatenated chain codes with a transformed chain code table

```
Input   : A transformed chain code table TT
Output: A bitstram B
/* W is the width of the header          */
/* H is the height of the header         */
 1 B[0..W * H] ← 0
 2 idx ← −1
 3 for i ← 0 to TT length do
 4 |   item ← TT[i]
 5 |   idx ← idx + item.Δi
 6 |   B[idx] ← 1
 7 |   if item.type is A then
 8 |   |   continue
 9 |   else if item.type is B then
10 |   |   code ← TT(i + item.Δn).code
11 |   |   length ← TT(i + item.Δn).legnth
12 |   else if item.type is C then
13 |   |   item.code ← getChainCodes(item.length)
14 |   |   code ← item.code
15 |   |   length ← item.length
16 |   c ← idx
17 |   for j ← 0 to length do
18 |   |   if code[j] is 0 then
19 |   |   |   c ← c + W
20 |   |   |   B[c] ← 1
21 |   |   else if code[j] is 1 then
22 |   |   |   c ← c + W − 1
23 |   |   |   B[c] ← 1
24 |   |   else if code[j] is 2 then
25 |   |   |   c ← c + W + 1
26 |   |   |   B[c] ← 1
27 |   end
28 end
```

For example, since the $\Delta_i$ of the first item in $TT_{bk}$ is 62, $B_{bk}[61]$ is set to 1. Since the type of this item is C and length is 1, the tag decodes one code from $R_{stage2}$ using Table 10.

Accordingly, since the result is 1, $B_{bk}[87]$ is set to 1. As a result of the process, the tag obtains $B_{bk}$ and $B_{rd}$.

Lastly, the tag performs the reverse binary MTFT S1307.

The tag performs the reverse binary MTFT on the bitstream generated from the S1305 step. The pseudo algorithm of the transform process is shown in Table 12.

TABLE 12

Algorithm 4: Reverse Binary Move-to-Front Transform

```
Input   : A bit array B
Output: A bit array B
 1 p ← 0
 2 for i ← 0 to B.length do
 3 |   b ← B[i]
 4 |   if b is 1 then
 5 |   |   if p is 1 then
 6 |   |   |   p ← 0
 7 |   |   else
 8 |   |   |   p ← 1
 9 |   B[i] ← p
10 end
```

The algorithm above may be improved to run faster using the algorithm of Table 13 which uses more memory.

TABLE 13

Algorithm 5: Reverse Binary Move-to-Front Transform using Transistion Table

```
Input   : A byte array B
Output: A byte array B
 1 T = Transition table of two dimentional array format (2 × 256)
 2 p ← 0
 3 for i ← 0 to B length do
 4 |   B[i],p ← T(B[i],p)
 5 end
```

FIG. 14 illustrates $O_{bk}$ and $O_{rd}$ generated through the reverse binary MTFT.

FIG. 15 illustrates an image generated through the reverse binary MTFT.

As shown in FIG. 14, a tag may obtain $O_{bk}$ and $O_{rd}$ by performing the S1307 step of FIG. 13. The $O_{bk}$ and $O_{rd}$ represent the image shown in FIG. 15.

These bitstreams may be passed on to an e-paper module or a tag and used but may require an additional conversion process. This process varies depending on the manufacturer of the module, and its description is omitted in the present disclosure.

[Performance of the Proposed Method of the Present Disclosure]

The performances of six compression algorithms including PackBits, LZW, Deflate, G3, G4, JBIG2, and the proposed method (ECO) of the present disclosure are measured. Three performance items were measured: compressed file size, compression time, and decompression time.

FIG. 16 is a test image used for testing performances of six compression algorithms of the present disclosure.

As shown in FIG. 16, a total of 36 images in three sizes were used for the evaluation. Table 14 shows the image sizes and color composition information of the images.

TABLE 14

| ID | Format | File Size | Width | Height | Black Pixels | Red Pixels | Blue Pixels | Orange Pixels | Magenta Pixels | Green Pixels | Yellow Pixels | White Pixels |
|---|---|---|---|---|---|---|---|---|---|---|---|---|
| Label 01 | PBM | 23115 | 152 | 152 | 5531 | — | — | — | — | — | — | 17573 |
| Label 02 | PBM | 23115 | 152 | 152 | 8073 | — | — | — | — | — | — | 15031 |
| Label 03 | PBM | 23115 | 152 | 152 | 12494 | — | — | — | — | — | — | 10610 |
| Label 04 | PBM | 23115 | 152 | 152 | 14674 | — | — | — | — | — | — | 8430 |
| Label 05 | PBM | 32779 | 250 | 128 | 6533 | — | — | — | — | — | — | 25467 |
| Label 06 | PBM | 32779 | 250 | 128 | 13152 | — | — | — | — | — | — | 18848 |
| Label 07 | PBM | 32779 | 250 | 128 | 19242 | — | — | — | — | — | — | 12758 |
| Label 08 | PBM | 32779 | 250 | 128 | 23649 | — | — | — | — | — | — | 8351 |
| Label 09 | PBM | 120011 | 400 | 300 | 24454 | — | — | — | — | — | — | 95546 |
| Label 10 | PBM | 120011 | 400 | 300 | 58921 | — | — | — | — | — | — | 61079 |
| Label 11 | PBM | 120011 | 400 | 300 | 74136 | — | — | — | — | — | — | 45864 |
| Label 12 | PBM | 120011 | 400 | 300 | 87614 | — | — | — | — | — | — | 32386 |
| Label 13 | PPM | 69327 | 152 | 152 | 3985 | 1546 | — | — | — | — | — | 17573 |
| Label 14 | PPM | 69327 | 152 | 152 | 3623 | 4449 | — | — | — | — | — | 15032 |
| Label 15 | PPM | 69327 | 152 | 152 | 2112 | 10382 | — | — | — | — | — | 10610 |
| Label 16 | PPM | 69327 | 152 | 152 | 1865 | 12809 | — | — | — | — | — | 8430 |
| Label 17 | PPM | 96015 | 250 | 128 | 4164 | 2369 | — | — | — | — | — | 25467 |
| Label 18 | PPM | 96015 | 250 | 128 | 4201 | 8951 | — | — | — | — | — | 18848 |
| Label 19 | PPM | 96015 | 250 | 128 | 2383 | 16859 | — | — | — | — | — | 12758 |
| Label 20 | PPM | 96015 | 250 | 128 | 1149 | 22500 | — | — | — | — | — | 8351 |
| Label 21 | PPM | 360015 | 400 | 300 | 11830 | 12624 | — | — | — | — | — | 95546 |
| Label 22 | PPM | 360015 | 400 | 300 | 16277 | 42644 | — | — | — | — | — | 61079 |
| Label 23 | PPM | 360015 | 400 | 300 | 6579 | 67557 | — | — | — | — | — | 45864 |
| Label 24 | PPM | 360015 | 400 | 300 | 5525 | 82089 | — | — | — | — | — | 32386 |
| Label 25 | PPM | 69327 | 152 | 152 | 1632 | 1546 | 1226 | 4398 | 520 | 607 | 6510 | 6665 |
| Label 26 | PPM | 69327 | 152 | 152 | 2325 | 2477 | 2843 | 258 | 169 | 5275 | 4753 | 5004 |
| Label 27 | PPM | 69327 | 152 | 152 | 963 | 9488 | 4323 | 1730 | 313 | 1580 | 1512 | 3195 |
| Label 28 | PPM | 69327 | 152 | 152 | 1865 | 4114 | 5419 | 544 | 282 | 1750 | 2994 | 6136 |
| Label 29 | PPM | 96015 | 250 | 128 | 2285 | 4871 | 2349 | 12631 | 520 | 1379 | 5048 | 2917 |
| Label 30 | PPM | 96015 | 250 | 128 | 3073 | 3582 | 1128 | 5249 | 3207 | 2162 | 7773 | 5826 |
| Label 31 | PPM | 96015 | 250 | 128 | 1234 | 1462 | 13865 | 1885 | 2681 | 1542 | 5101 | 4230 |
| Label 32 | PPM | 96015 | 250 | 128 | 850 | 10100 | 7740 | 4660 | 299 | 780 | 1946 | 5625 |
| Label 33 | PPM | 360015 | 400 | 300 | 10236 | 1842 | 12981 | 47724 | 18518 | 8558 | 10782 | 9359 |
| Label 34 | PPM | 360016 | 400 | 300 | 16277 | 18401 | 19401 | 2564 | 4842 | 18190 | 27386 | 12939 |
| Label 35 | PPM | 360015 | 400 | 300 | 6579 | 30611 | 10545 | 13382 | 7391 | 16173 | 15957 | 19362 |
| Label 36 | PPM | 360015 | 400 | 300 | 4878 | 1702 | 4717 | 32158 | 12361 | 14832 | 21683 | 27669 |

US 12,579,693 B2

19

Some algorithms may compress only monochrome images. Accordingly, multi-color images are converted into monochrome images, and performances are measured using the monochrome images. For example, in the measurement result shown below, PackBits(A) refers to the measurement result using one multi-color image while PackBits(B) refers to the sum of the measurement results using multiple monochrome images. Since G3, G4, and JBIG2 are unable to compress multi-color images, the performances of these algorithms are evaluated using multiple monochrome images only.

The performances of other algorithms except for the ECO were evaluated using the source code of JBIG2 and LibTiff. The performances of all the algorithms were measured in the same environment. All the measurements were repeated 1000 times, and the average value of the measurements was used. The compression and decompression time data may be measured differently depending on a method for implementing the corresponding algorithm or a test environment.

Table 15 shows the comparison of compressed image file sizes from the respective algorithms.

TABLE 15

| ID | Original | PackBit (A) | PackBit (B) | LZW (A) | LZW (B) | Deflate (A) | Deflate (B) | G3 | G4 | JBIG2 | ECO |
|---|---|---|---|---|---|---|---|---|---|---|---|
| Label01 | 23115 | 2092 | — | 1390 | — | 1064 | — | 2094 | 1092 | 700 | 784 |
| Label02 | 23115 | 2320 | — | 1464 | — | 1110 | — | 2226 | 1070 | 812 | 806 |
| Label03 | 23115 | 1992 | — | 1330 | — | 972 | — | 2020 | 944 | 742 | 711 |
| Label04 | 23115 | 2336 | — | 1506 | — | 1058 | — | 2404 | 1126 | 876 | 791 |
| Label05 | 32779 | 2342 | — | 1506 | — | 1108 | — | 2344 | 1174 | 718 | 806 |
| Label06 | 32779 | 3104 | — | 1776 | — | 1270 | — | 2682 | 1194 | 907 | 857 |
| Label07 | 32779 | 2508 | — | 1512 | — | 1012 | — | 2248 | 970 | 726 | 688 |
| Label08 | 32779 | 2810 | — | 1688 | — | 1138 | — | 2420 | 1112 | 910 | 830 |
| Label09 | 120011 | 7336 | — | 3960 | — | 2552 | — | 5494 | 2116 | 1317 | 1588 |
| Label10 | 120011 | 8428 | — | 4316 | — | 2920 | — | 6148 | 2194 | 1604 | 1692 |
| Label11 | 120011 | 7384 | — | 4010 | — | 2510 | — | 5882 | 2108 | 1540 | 1583 |
| Label12 | 120011 | 7966 | — | 4286 | — | 2668 | — | 6494 | 2328 | 1692 | 1688 |
| Label13 | 69327 | 11446 | 4172 | 2154 | 2542 | 1608 | 1258 | 2710 | 1260 | 831 | 787 |
| Label14 | 69327 | 19760 | 4592 | 2328 | 2840 | 1724 | 1312 | 2866 | 1242 | 940 | 820 |
| Label15 | 69327 | 36154 | 4486 | 2094 | 2494 | 1582 | 1186 | 2650 | 1114 | 879 | 717 |
| Label16 | 69327 | 43910 | 5238 | 2246 | 2904 | 1768 | 1268 | 3046 | 1296 | 998 | 812 |
| Label17 | 96015 | 14876 | 5244 | 2600 | 2744 | 1740 | 1320 | 2920 | 1338 | 868 | 815 |
| Label18 | 96015 | 34484 | 6336 | 3128 | 3584 | 2062 | 1488 | 3276 | 1360 | 1039 | 876 |
| Label19 | 96015 | 56388 | 5812 | 2460 | 2964 | 1764 | 1230 | 2846 | 1136 | 858 | 694 |
| Label20 | 96015 | 72240 | 6232 | 2784 | 3282 | 1954 | 1334 | 3016 | 1280 | 1041 | 839 |
| Label21 | 360015 | 55288 | 16208 | 7822 | 8182 | 4274 | 2776 | 6748 | 2306 | 1486 | 1593 |
| Label22 | 360015 | 143550 | 17882 | 8642 | 9456 | 4816 | 3194 | 7424 | 2396 | 1769 | 1707 |
| Label23 | 360015 | 217038 | 18700 | 8208 | 8382 | 4462 | 2746 | 7094 | 2300 | 1729 | 1603 |
| Label24 | 360015 | 260840 | 20368 | 9032 | 8996 | 4684 | 2916 | 7748 | 2522 | 1841 | 1671 |
| Label25 | 69327 | 49204 | 4940 | 2136 | 5690 | 3360 | 2616 | 6460 | 2430 | 1851 | 1124 |
| Label26 | 69327 | 51902 | 5076 | 2216 | 6050 | 3510 | 2676 | 6606 | 2412 | 1961 | 1167 |
| Label27 | 69327 | 60176 | 5082 | 2078 | 6098 | 3682 | 2792 | 6608 | 2490 | 2117 | 1290 |
| Label28 | 69327 | 50204 | 5488 | 2320 | 5800 | 3324 | 2516 | 6440 | 2332 | 1914 | 1039 |
| Label29 | 96015 | 85328 | 6668 | 2756 | 6510 | 4186 | 3102 | 7072 | 2878 | 2252 | 1511 |
| Label30 | 96015 | 75576 | 7208 | 3070 | 7208 | 4234 | 3058 | 7038 | 2558 | 2115 | 1285 |
| Label31 | 96015 | 83796 | 6636 | 2412 | 6532 | 3922 | 2794 | 6536 | 2420 | 2042 | 1187 |
| Label32 | 96015 | 80458 | 6710 | 2764 | 5936 | 3682 | 2642 | 6294 | 2386 | 1951 | 1129 |
| Label33 | 360015 | 313382 | 20954 | 7718 | 17126 | 8872 | 5686 | 15740 | 4388 | 3441 | 2659 |
| Label34 | 360015 | 284428 | 20782 | 8666 | 18104 | 9114 | 6522 | 15314 | 4044 | 3211 | 2445 |
| Label35 | 360015 | 294152 | 20976 | 8880 | 15134 | 7914 | 4582 | 14228 | 3756 | 3117 | 2087 |
| Label36 | 360015 | 275372 | 21070 | 9084 | 14178 | 7368 | 4558 | 14300 | 3842 | 2942 | 2024 |

FIG. 17 shows the average bits per pixel of each group. Images are grouped according to their size, and average bits per pixel were obtained for each group as shown in FIG. 17.

The result showed that in the case of monochrome images, ECO and JBIG2 showed the lowest BPP, exhibiting the highest compression ratio. However, for the 3-color and 8-color images, ECO showed a higher compression ratio than JBIG2. This result indicates that as the color palette size increases, the ECO's compression efficiency becomes better than that of JBIG2.

Table 16 shows the comparison of the image compression time from the respective algorithms.

TABLE 16

| ID | PackBit (A) | PackBit (B) | LZW (A) | LZW (B) | Deflate (A) | Deflate (B) | G3 | G4 | JBIG2 | ECO |
|---|---|---|---|---|---|---|---|---|---|---|
| Label01 | 0.2845 | — | 0.4038 | — | 0.5893 | — | 0.3694 | 0.4466 | 1.4975 | 1.1274 |
| Label02 | 0.2860 | — | 0.4048 | — | 0.5860 | — | 0.3718 | 0.4506 | 1.5238 | 1.1355 |

TABLE 16-continued

| ID | PackBit (A) | PackBit (B) | LZW (A) | LZW (B) | Deflate (A) | Deflate (B) | G3 | G4 | JBIG2 | ECO |
|---|---|---|---|---|---|---|---|---|---|---|
| Label03 | 0.2824 | — | 0.4004 | — | 0.5847 | — | 0.3658 | 0.4372 | 1.5306 | 1.0972 |
| Label04 | 0.2855 | — | 0.4064 | — | 0.5625 | — | 0.3762 | 0.4562 | 1.5255 | 1.1704 |
| Label05 | 0.2871 | — | 0.4071 | — | 0.5915 | — | 0.3816 | 0.4720 | 1.5991 | 1.3138 |
| Label06 | 0.2915 | — | 0.4159 | — | 0.6165 | — | 0.3887 | 0.4868 | 1.7176 | 1.3681 |
| Label07 | 0.2859 | — | 0.4107 | — | 0.5747 | — | 0.3751 | 0.4503 | 1.5835 | 1.2667 |
| Label08 | 0.2899 | — | 0.4146 | — | 0.5843 | — | 0.3808 | 0.4679 | 1.5758 | 1.3482 |
| Label09 | 0.3363 | — | 0.5491 | — | 0.8627 | — | 0.4922 | 0.6642 | 3.5688 | 3.4804 |
| Label10 | 0.3452 | — | 0.5458 | — | 1.0323 | — | 0.4995 | 0.6783 | 3.2219 | 3.6091 |
| Label11 | 0.3365 | — | 0.5253 | — | 0.7949 | — | 0.4919 | 0.6656 | 3.5396 | 3.6276 |
| Label12 | 0.3386 | — | 0.5393 | — | 0.8175 | — | 0.5071 | 0.6931 | 3.3415 | 3.6991 |
| Label13 | 0.4123 | 0.7644 | 1.3957 | 1.3560 | 1.5740 | 1.8704 | 1.4816 | 1.5558 | 2.8553 | 1.2602 |
| Label14 | 0.4547 | 0.7688 | 1.5375 | 1.3612 | 1.5776 | 1.8828 | 1.4891 | 1.5652 | 2.8829 | 1.2495 |
| Label15 | 0.5195 | 0.7681 | 1.4388 | 1.3737 | 1.5913 | 1.8929 | 1.5017 | 1.5690 | 2.8779 | 1.2064 |
| Label16 | 0.5496 | 0.7798 | 1.5375 | 1.3890 | 1.6070 | 1.8876 | 1.5235 | 1.6068 | 2.9079 | 1.2971 |
| Label17 | 0.4536 | 0.9037 | 1.6031 | 1.4854 | 1.7107 | 2.0024 | 1.6223 | 1.7164 | 3.1334 | 1.4859 |
| Label18 | 0.5431 | 0.9274 | 2.0032 | 1.5085 | 1.7361 | 2.0553 | 1.6495 | 1.7427 | 3.2351 | 1.5309 |
| Label19 | 0.6303 | 0.9205 | 1.6310 | 1.5214 | 1.7458 | 2.0212 | 1.6444 | 1.7253 | 3.1773 | 1.4314 |
| Label20 | 0.6963 | 0.9220 | 1.7931 | 1.5413 | 1.7646 | 2.0417 | 1.6716 | 1.7654 | 3.1992 | 1.5264 |
| Label21 | 0.9255 | 2.3132 | 4.1030 | 2.7744 | 3.0943 | 3.5427 | 2.9684 | 3.1498 | 6.9584 | 4.1102 |
| Label22 | 1.2731 | 2.3469 | 4.8619 | 2.8883 | 3.2121 | 3.7658 | 3.0805 | 3.2706 | 6.5890 | 4.2031 |
| Label23 | 1.5539 | 2.3627 | 4.4959 | 2.9151 | 3.2433 | 3.6381 | 3.1110 | 3.2982 | 7.0799 | 4.2388 |
| Label24 | 1.7276 | 2.3991 | 4.9748 | 2.9809 | 3.3014 | 3.7185 | 3.1895 | 3.3811 | 6.9604 | 4.3517 |
| Label25 | 0.5532 | 0.7710 | 1.4592 | 3.2107 | 3.9591 | 4.8510 | 3.5572 | 3.6717 | 6.6183 | 2.0544 |
| Label26 | 0.5617 | 0.7655 | 1.5359 | 3.1359 | 3.8796 | 4.7850 | 3.4806 | 3.5999 | 6.5851 | 2.0645 |
| Label27 | 0.5920 | 0.7665 | 1.3947 | 3.1812 | 3.9283 | 4.8346 | 3.5324 | 3.6530 | 6.7536 | 2.1061 |
| Label28 | 0.5600 | 0.7663 | 1.5398 | 3.1286 | 3.8948 | 4.7173 | 3.4939 | 3.5944 | 6.5621 | 2.0284 |
| Label29 | 0.7040 | 0.9196 | 1.7452 | 3.3933 | 4.1719 | 5.0867 | 3.7684 | 3.9348 | 7.6741 | 2.7520 |
| Label30 | 0.6935 | 0.9132 | 1.9561 | 3.4094 | 4.1843 | 5.0985 | 3.7676 | 3.9163 | 7.4146 | 2.6077 |
| Label31 | 0.7108 | 0.9051 | 1.5765 | 3.4078 | 4.1881 | 5.0388 | 3.7452 | 3.8887 | 7.4021 | 2.5665 |
| Label32 | 0.7171 | 0.9114 | 1.7046 | 3.4369 | 4.2215 | 5.0303 | 3.7870 | 3.9169 | 7.4040 | 2.5338 |
| Label33 | 1.8541 | 2.3941 | 4.1273 | 5.3793 | 6.4213 | 7.7056 | 5.8316 | 6.1441 | 15.8971 | 8.2895 |
| Label34 | 1.8046 | 2.3767 | 4.6854 | 5.3695 | 6.4238 | 7.8205 | 5.8065 | 6.0718 | 15.1071 | 8.1834 |
| Label35 | 1.8295 | 2.4042 | 4.9235 | 5.3126 | 6.3811 | 7.4063 | 5.7526 | 6.0032 | 15.4273 | 7.9932 |
| Label36 | 1.7101 | 2.4199 | 4.8496 | 5.2923 | 6.3393 | 7.3886 | 5.7356 | 5.9826 | 14.6490 | 8.0444 |

FIG. 18 shows average compression time of each group.

As shown in FIG. 18, for monochrome images, ECO and JBIG2 showed longer compression time than the other algorithms. However, for the 3-color and 8-color images, ECO showed shorter compression time than JBIG2.

Table 17 shows the comparison of the image decompression time from the respective algorithms.

TABLE 17

| ID | PackBit (A) | PackBit (B) | LZW (A) | LZW (B) | Deflate (A) | Deflate (B) | G3 | G4 | JBIG2 | ECO |
|---|---|---|---|---|---|---|---|---|---|---|
| Label01 | 0.5303 | — | 0.6076 | — | 0.5774 | — | 0.6441 | 0.6444 | 0.4514 | 0.3478 |
| Label02 | 0.5274 | — | 0.6118 | — | 0.5768 | — | 0.6395 | 0.6493 | 0.5020 | 0.3420 |
| Label03 | 0.5275 | — | 0.6117 | — | 0.5712 | — | 0.6383 | 0.6382 | 0.5204 | 0.3201 |
| Label04 | 0.5337 | — | 0.1602 | — | 0.5709 | — | 0.6420 | 0.6493 | 0.5288 | 0.3488 |
| Label05 | 0.5772 | — | 0.6576 | — | 0.6236 | — | 0.6930 | 0.6940 | 0.4932 | 0.3608 |
| Label06 | 0.5729 | — | 0.6537 | — | 0.6246 | — | 0.6950 | 0.6959 | 0.5958 | 0.3702 |
| Label07 | 0.5751 | — | 0.6509 | — | 0.6166 | — | 0.6862 | 0.6853 | 0.5752 | 0.3209 |
| Label08 | 0.5759 | — | 0.6649 | — | 0.6144 | — | 0.6859 | 0.6987 | 0.5969 | 0.3563 |
| Label09 | 1.0057 | — | 1.1298 | — | 1.0336 | — | 1.1753 | 1.2010 | 1.2684 | 0.6017 |
| Label10 | 1.0300 | — | 1.1227 | — | 1.0454 | — | 1.1875 | 1.1628 | 1.2063 | 0.6133 |
| Label11 | 1.0097 | — | 1.3228 | — | 1.0297 | — | 1.1480 | 1.1204 | 1.3407 | 0.6035 |
| Label12 | 0.9788 | — | 1.0731 | — | 1.0360 | — | 1.1622 | 1.1383 | 1.2318 | 0.6297 |
| Label13 | 0.5815 | 0.7583 | 0.6649 | 1.0607 | 1.1997 | 1.1405 | 1.2256 | 1.2167 | 0.7289 | 0.4523 |
| Label14 | 0.5862 | 0.7566 | 0.6583 | 1.0594 | 1.1981 | 1.1671 | 1.2396 | 1.2254 | 0.7488 | 0.4472 |
| Label15 | 0.5907 | 0.7565 | 0.6530 | 1.0563 | 1.2023 | 1.1461 | 1.2363 | 1.2140 | 0.8035 | 0.4187 |
| Label16 | 0.6066 | 0.7626 | 0.6449 | 1.0600 | 1.2003 | 1.1440 | 1.2384 | 1.2252 | 0.8067 | 0.4527 |
| Label17 | 0.6389 | 0.8606 | 0.7572 | 1.1528 | 1.2874 | 1.2416 | 1.3334 | 1.3034 | 0.7810 | 0.4679 |
| Label18 | 0.6494 | 0.8688 | 0.7434 | 1.1587 | 1.2841 | 1.2365 | 1.3452 | 1.3138 | 0.8144 | 0.4784 |
| Label19 | 0.6581 | 0.8753 | 0.7354 | 1.1598 | 1.2855 | 1.2308 | 1.3336 | 1.2987 | 0.8575 | 0.4302 |
| Label20 | 0.6651 | 0.8632 | 0.7216 | 1.1395 | 1.2829 | 1.2326 | 1.3343 | 1.2996 | 0.8789 | 0.4961 |
| Label21 | 1.2001 | 1.8646 | 1.5809 | 2.0185 | 2.1837 | 2.1602 | 2.2903 | 2.1599 | 1.5885 | 0.7827 |
| Label22 | 1.2467 | 1.8738 | 1.4933 | 2.0430 | 2.1568 | 2.1669 | 2.2922 | 2.1852 | 1.4244 | 0.7914 |
| Label23 | 1.2603 | 1.9137 | 1.4661 | 1.9981 | 2.1567 | 2.1247 | 2.2474 | 2.1918 | 1.6614 | 0.7923 |
| Label24 | 1.3051 | 1.8963 | 1.4461 | 2.0368 | 2.1387 | 2.1288 | 2.2591 | 2.2472 | 1.5463 | 0.8099 |
| Label25 | 0.5811 | 0.7617 | 0.6446 | 3.6469 | 4.1928 | 3.9802 | 4.1616 | 4.1362 | 2.2697 | 0.9362 |

TABLE 17-continued

| ID | PackBit (A) | PackBit (B) | LZW (A) | LZW (B) | Deflate (A) | Deflate (B) | G3 | G4 | JBIG2 | ECO |
|---|---|---|---|---|---|---|---|---|---|---|
| Label26 | 0.5817 | 0.7628 | 0.6426 | 3.6672 | 4.1544 | 3.9676 | 4.1695 | 4.1311 | 2.2808 | 0.9316 |
| Label27 | 0.5837 | 0.7675 | 0.6450 | 3.6833 | 4.1742 | 3.9778 | 4.1493 | 4.1383 | 2.3205 | 0.9593 |
| Label28 | 0.5918 | 0.7633 | 0.6441 | 3.6676 | 4.1668 | 3.9510 | 4.1629 | 4.1330 | 2.2914 | 0.9134 |
| Label29 | 0.6505 | 0.8670 | 0.7255 | 4.0034 | 4.4856 | 4.3064 | 4.4869 | 4.4608 | 2.5018 | 1.0704 |
| Label30 | 0.6557 | 0.8736 | 0.7191 | 3.9730 | 4.5042 | 4.3069 | 4.4674 | 4.4681 | 2.4379 | 0.9962 |
| Label31 | 0.6500 | 0.8704 | 0.7260 | 3.9079 | 4.4981 | 4.3140 | 4.4772 | 4.3952 | 2.4163 | 0.9836 |
| Label32 | 0.6512 | 0.8737 | 0.7201 | 3.9579 | 4.4909 | 4.3150 | 4.4624 | 4.3913 | 2.4137 | 0.9680 |
| Label33 | 1.2416 | 1.9364 | 1.4506 | 6.9010 | 7.5138 | 7.2049 | 7.5947 | 7.4953 | 3.9541 | 1.8057 |
| Label34 | 1.2699 | 1.9272 | 1.4915 | 6.9437 | 7.5828 | 7.2256 | 7.5421 | 7.5124 | 3.6873 | 1.7375 |
| Label35 | 1.2729 | 1.9471 | 1.4784 | 6.9453 | 7.5737 | 7.2674 | 7.5414 | 7.4634 | 3.9580 | 1.6650 |
| Label36 | 1.2573 | 1.9593 | 1.5004 | 6.8711 | 7.4480 | 7.2567 | 7.5106 | 7.4573 | 3.1668 | 1.7002 |

FIG. 19 shows average decompression time of each group.

As shown in FIG. 19, for monochrome and 3-color images, ECO showed the shortest decompression time. For the case of 8-color images, some algorithms showed shorter decompression time than ECO, but the algorithms showed relatively lower compression ratio than ECO.

FIG. 20 shows a performance measurement result for images of the same type in different colors.

As shown in FIG. 20, on the whole, as the number of colors is increased, all of the algorithms showed a lower compression ratio and took more time to compress and decompress images. However, ECO mostly showed relatively lower performance degradation than other algorithms.

INTERPRETATION OF THE PRESENT DISCLOSURE

Particular embodiments or other embodiments of the present disclosure described above are not mutually exclusive to each other or distinguishable from each other. Individual structures or functions of particular embodiments or other embodiments of the present disclosure described above may be used in parallel therewith or in combination thereof.

For example, it means that structure A described with reference to a specific embodiment and/or figure and structure B described with reference to another embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

What is claimed is:

1. An Electronic Shelf Label (ESL) management server for compressing an image to be displayed on an external display device of an ESL system, the server comprising:
a communication unit obtaining an image including product information; and
a processor
converting the image into a character string,
applying a first pre-processing process to the character string, chain coding the character string to which the first pre-processing process has been applied,
encoding a chain code and a chain code table obtained as a result of the chain coding into a bitstream,
generating a compressed image file using the bitstream, and
transmitting the compressed image file to an external display device through the communication unit,
where the first pre-processing process converts data with a high local correlation within the image into a small integer but converts data with a small local correlation within the image into a large integer,
wherein the processor performs chain coding on the pixels within the image in the downward direction from upper pixels to lower pixels to obtain adjoining chain codes,
wherein the processor separates the image into a plurality of mono-color images, converts the plurality of mono-color images into a plurality of character string and extracts one image for each separated color component,
wherein the processor converts white pixels among the pixels within the plurality of mono-color images into 0 and converts the remaining pixels into 1, and
wherein the processor performs the image separation operation and the first pre-processing operation simultaneously.

2. The server of claim 1, wherein the first pre-processing process uses Move-to-Front Transform (MTFT) algorithm.

3. The server of claim 2, wherein the integer is a binary integer.

4. The server of claim 1, wherein the processor obtains the chain code table as a result of the chain coding,
classifies the respective items of the chain code table according to their types, and
encodes the respective items of the chain code table into a bitstream based on the classification result.

5. The server of claim 4, wherein the processor encodes each item of the chain code table into a bitstream based on the frequency of each item type.

6. The server of claim 5, wherein the processor encodes each item of the chain code table into a bitstream based on the item length.

7. The server of claim 1, wherein the compressed image file includes at least one of the data bit length, width, height, type code, color palette size, and chain code table size.

8. A display device, the device comprising:
a communication unit obtaining the compressed image file, which is compressed by the Electronic Shelf Label (ESL) management server of claim 1; and
a processor,
parsing the header of the image file,
decoding transformed chain code tables of the image file, decoding adjoining chain codes of the image file, and performing the inverse of a first pre-processing process on the image file.

9. The display device of claim 8, wherein the inverse of the first pre-processing process is the inverse of Move-to-Front Transform (MTFT) algorithm.

10. The display device of claim 9, wherein the integer is a binary integer.

11. The display device of claim 8, wherein the processor decodes adjoining chain codes of the image file in the downward direction from upper pixels to lower pixels of the image file.

12. A method for controlling an ESL management server, the method comprising:

obtaining an image including product information;

converting the image into a character string, applying a first pre-processing process to the character string;

chain coding the character string to which the first pre-processing has been applied;

encoding a chain code and a chain code table obtained as a result of the chain coding into a bitstream;

generating a compressed image file using the bitstream; and transmitting the compressed image file to an external display device through the communication unit, where the first pre-processing process converts data with a high local correlation within the image into a small integer but converts data with a small local correlation within the image into a large integer, wherein chain coding is performed on the pixels within the image in the downward direction from upper pixels to lower pixels to obtain adjoining chain codes, wherein the image is separated into a plurality of mono-color images, the plurality of mono-color images is converted into a plurality of character string, and one image is extracted for each separated color component, wherein white pixels among the pixels within the plurality of mono-color images are converted into 0 and the remaining pixels are converted into 1, and wherein the image separation operation and the first pre-processing operation are performed simultaneously.

* * * * *